(12) United States Patent
Case et al.

(10) Patent No.: US 10,671,658 B2
(45) Date of Patent: Jun. 2, 2020

(54) SYSTEMS AND METHODS FOR AUTOMATICALLY GENERATING SUPPLEMENTAL CONTENT FOR A MEDIA ASSET BASED ON A USER'S PERSONAL MEDIA COLLECTION

(71) Applicant: Rovi Guides, Inc., San Jose, CA (US)

(72) Inventors: Michael Case, Sherman Oaks, CA (US); Marvin Carlberg, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 284 days.

(21) Appl. No.: 15/902,663

(22) Filed: Feb. 22, 2018

(65) Prior Publication Data
US 2019/0258720 A1 Aug. 22, 2019

(51) Int. Cl.
| G06F 17/00 | (2019.01) |
| G06F 16/487 | (2019.01) |
| G06F 16/48 | (2019.01) |
| G06F 16/438 | (2019.01) |
| G06F 16/435 | (2019.01) |
| G06F 16/41 | (2019.01) |

(52) U.S. Cl.
CPC ............ *G06F 16/487* (2019.01); *G06F 16/41* (2019.01); *G06F 16/435* (2019.01); *G06F 16/438* (2019.01); *G06F 16/489* (2019.01)

(58) Field of Classification Search
CPC .... G06F 16/487; G06F 16/489; G06F 16/438; G06F 16/435; G06F 16/41; G06F 16/4393
See application file for complete search history.

(56) References Cited

U.S. PATENT DOCUMENTS

| 6,239,794 B1 | 5/2001 | Yuen et al. |
| 6,564,378 B1 | 5/2003 | Satterfield et al. |
| 6,611,622 B1 | 8/2003 | Krumm |
| 6,636,635 B2 | 10/2003 | Matsugu |
| 6,661,418 B1 | 12/2003 | McMillan et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 8,627,358 B1 | 1/2014 | Kessenger et al. |

(Continued)

OTHER PUBLICATIONS

Takeshi Kurashima et al., Travel Route Recommendation Using Geotags in Photo Sharing Sites, CIKM '10: Proceedings of the 19th ACM International Conference on Information and Knowledge Management, pp. 579-588, Oct. 2010.*

(Continued)

*Primary Examiner* — Greta L Robinson
(74) *Attorney, Agent, or Firm* — Haley Guiliano LLP

(57) ABSTRACT

Systems and methods describe presenting media to a user at a user device, determining a location relevant to the media, determining whether the user has visited a vicinity of the location by searching through information related to the user, and based on to determining that the user has visited the vicinity of the location searching through the user's personal collection of media in a time window corresponding to the user's visit to retrieve personal media related to the location, and generating for display, based on the searching, a list of personal media related to the location relevant to the media being presented at the user device.

20 Claims, 12 Drawing Sheets

(56) References Cited

U.S. PATENT DOCUMENTS

| | | | |
|---|---|---|---|
| 9,940,583 B1* | 4/2018 | Pillai | H04L 67/10 |
| 10,366,439 B2* | 7/2019 | Leonard | G06Q 30/0639 |
| 2002/0174430 A1 | 11/2002 | Ellis et al. | |
| 2003/0085913 A1 | 5/2003 | Ahmad et al. | |
| 2005/0251827 A1 | 11/2005 | Ellis et al. | |
| 2009/0204243 A1 | 8/2009 | Marwaha et al. | |
| 2010/0076968 A1* | 3/2010 | Boyns | H04W 4/21 |
| | | | 707/732 |
| 2010/0153885 A1 | 6/2010 | Yates | |
| 2013/0054698 A1* | 2/2013 | Lee | G06Q 30/0259 |
| | | | 709/204 |
| 2015/0067049 A1 | 3/2015 | Egan et al. | |
| 2017/0032384 A1* | 2/2017 | Harris | G06Q 30/0201 |
| 2017/0069000 A1* | 3/2017 | Duleba | G06F 16/23 |
| 2017/0142176 A1 | 5/2017 | Bostick et al. | |

OTHER PUBLICATIONS

"Method and system for augmenting personal travel data in video screen", An IP.com Prior Art Database Technical Disclosure, IP.com No. IPCOM000251631D, Nov. 20, 2017, 4 pages.

ISR and Written Opinion in PCT/US2019/015222 dated Oct. 1, 2019.

* cited by examiner

SYSTEMS AND METHODS FOR AUTOMATICALLY GENERATING SUPPLEMENTAL CONTENT FOR A MEDIA ASSET BASED ON A USER'S PERSONAL MEDIA COLLECTION

BACKGROUND

While consuming a media asset, a user may wish to add an individualized touch to their viewing experience using personal media. Conventional media guidance applications are not able to create supplemental content based on personalized viewing experience of the user. The user is limited to consuming the media asset that is provided and has to separately personalize his experience by looking through self-generated media and putting the self-generated media together to view along with or after the media asset that user is watching.

While watching a media asset, the user may identify a landmark in the media asset that they previously visited. The user may have to manually search through his personal collection of pictures and videos related to the location. The user will also have to determine not only when he made the trip to the landmark, but where he visited that particular landmark. This process is onerous and time consuming and interrupts the user's viewing experience. While conventional systems may be able to put together supplemental content related to a topic, such content is generally curated and preselected for presentation to the general population and does not include personal content that the user may have generated related to the topic.

SUMMARY

Accordingly, systems and methods are provided herein for automatically generating content supplemental to content being consumed by a user via a media asset. For example, a user may be watching a program relating to the construction of Burj Khalifa in Dubai, and a media guidance application may be configured to create supplemental content related to the program using media generated by the user during their trip to Dubai.

The described method of automatically generating content supplemental to the media asset determines whether a user has visited the location discussed in the media asset. Upon determining whether the user has visited the location (e.g., Dubai), the media guidance application is able to limit searching through the user's personal media to the time period of the user's trip to the location (e.g., Dubai) instead of all the media generated by the user. From the media of the trip to Dubai, the media guidance application may determine whether there is any media (e.g., pictures, videos, audio) relating to the Burj Khalifa. The media guidance application may generate supplemental content based on the media identified to be relevant after performing the search. This automatic generation of supplemental content improves the user's viewing experience.

In some aspects, the media guidance application may generate supplemental media content for a media asset being consumed by a user based on content generated by the user that relates to a location referenced in the media asset. For example, the user may be consuming a television program related to the construction challenges of 'Burj Khalifa'. The media guidance application may generate supplemental content related to 'Burj Khalifa' using media generated by the user.

The media guidance application may present a media asset to the user. For example, the media guidance application may generate a program on a device associated with the user. The program may be one of a television program, a podcast, a song or in any other format consumed by the user. The media guidance application determines a location referenced in the media asset. For example, the media guidance application may determine that the program the user is consuming is related to 'Burj Khalifa' in Dubai. The media guidance application may determine the location from the program to be 'Burj Khalifa'.

The media guidance application now determines whether the user visited the determined location (e.g., Burj Khalifa). The media guidance application may retrieve a history of physical locations the user has visited from a profile of the user. The user profile may contain the travel itineraries of the user, which the media guidance application may search to determine whether the user visited Dubai.

Upon determining that the user visited the determined location (e.g., Burj Khalifa), the media guidance application determines whether the user visited the vicinity of 'Burj Khalifa'. The media guidance application determines whether the user has visited a vicinity of the location referenced in the media asset. For example, the media guidance application may calculate the vicinity of 'Burj Khalifa' to be 'Dubai', 'Downtown Dubai', 'Dubai Mall', 'Sheikh Zayed Road', 'The Address' etc. based on a distance from the 'Burj Khalifa'.

The media guidance application determines a time period of the visit to the vicinity of the determined location (e.g., Burj Khalifa). In response to determining that the user has visited the vicinity of the location referenced in the media asset, the media guidance application determines from the history, a period of time during which the user visited the vicinity of the location referenced in the media asset. For example, the media guidance application may determine, from the travel itineraries of the user, whether the user has visited 'Dubai', which is determined to be in the vicinity of 'Burj Khalifa'. In this example, the media guidance application may determine that the user had a trip to Dubai from Jan. 19, 2018-Jan. 28, 2018.

The media guidance application begins searching through personal media generated by the user when the media guidance application determines that the user has visited the vicinity (e.g., Dubai) of the determined location (e.g., Burj Khalifa). The media guidance application searches through media generated by the user to retrieve a first set of the media having a time stamp within the determined period of time. For example, every element of media (e.g., photos, videos, audio, text files) generated by the user may be time stamped at the time of generation. The media guidance may only search a database containing media generated by the user between the dates of the trip using the time stamps associated with the user generated media.

From the user generated media that is within the dates of the trip of the user to the vicinity of the location (e.g., Dubai), the media guidance application determines media associated with the location (e.g., Burj Khalifa). The media guidance application determines from the first set of retrieved media, a second set of media that corresponds to the location, and generates for consumption the second set of media. For example, the media guidance application may search the media generated within the days of the trip to Dubai for media (e.g., photos, pictures, audio, and text) for media that corresponds to Burj Khalifa. The media guidance application may put together all the media that fits the search criteria and provide the generated supplemental content to the user for consumption.

The media guidance application saves a current location along with each and every media generated by the user. In some embodiments, the media guidance application determines, at the time of generation of each user generated media, a current location of the user, and saves the determined current location as part of a geotag along with each user generated media. For example, at the time of generation of any media by the user, the device on which the media is generated may provide a location to an application that is generating the media. The application generating the media may save the location with media that has been generated as part of a geotag of the media.

The media guidance application determines a location associated with a media by examining a geotag saved along with the media and compares the determined location to the location (e.g., 'Burj Khalifa') determined from the media asset (e.g., TV program). In some embodiments, the media guidance application extracts the geotag from a media in the first set of media, determines a respective location of the media from the extracted geotag, compares the respective location of the media in the first set of media to the location; and based on the comparing, determines whether the respective location of the media in the first set of media is within a predetermined distance from the location. For example, the media guidance application may determine from a geotag associated with an image that the location of the image is 'The Address' hotel in Dubai. The media guidance application then computes a distance between the 'The Address' hotel and 'Burj Khalifa'. The media guidance application may determine the distance to be 0.5 miles, which may be within a threshold distance of 2 miles from the determined location of 'Burj Khalifa'.

The media guidance application determines a presence of a landmark associated with the location in the media that is within the threshold distance of the location. In some embodiments, in response to determining that the respective location is within the predetermined distance, the media guidance application analyzes each media associated with the respective location to determine a presence of a landmark specific to the location, and in response to determining the presence of the landmark specific to the location, the media guidance application classifies the media to the second set of media that corresponds to the location. For example, the media guidance application, in the media asset with the geotag of the 'The Address' hotel, may search for a presence of a portion of the building 'Burj Khalifa' that is associated with the location of 'Burj Khalifa'.

The media guidance application may determine an order to arrange the multiple user generated media elements that re related to the location (e.g., Burj Khalifa). In some embodiments, the media guidance application arranges each media in the second set of media that corresponds to the location in an order based on a distance computed between the respective location of each media and the location. For example, the media guidance application may identify multiple pictures of the user at multiple locations in the vicinity of 'Burj Khalifa'. The media guidance application may arrange them in an ascending order of the distance. The picture closest to the 'Burj Khalifa' may be first and the picture furthest from the 'Burj Khalifa' within the predetermined threshold of distance may be presented last.

The media guidance application also saves a time stamp along with the media generated by the user where the time stamp indicates a current time of generation of media. In some embodiments, the media guidance application saves along with the media generated by the user, the time stamp indicating the time of generation of the media. For example, at the time the user is generating media at a location, the application being used to generate the media may query the device on which the application is running for a current time, and save the current time along with the media generated.

The media guidance application may determine itineraries of a user's travel from a calendar associated with the user profile. In some embodiments, the media guidance application extracts the user's calendar from the user's profile, determines from the user's calendar, events that indicate travel of the user from one place to another, determines from the events, itineraries of the user's trips to various physical locations, and determines from the itineraries, the period of time, during which the user visited the physical location. For example, the media guidance application determines from a user's calendar that the user blocked out January 19-January 28 to travel to Dubai. The media guidance application may determine a travel itinerary associated with the exact dates of their travel. From the exact dates and arrival times of the flight, the media guidance application may determine a time period that the user spent in Dubai.

The media guidance application compares the time stamp of each media in the user generated media asset to the determined time period of the user's visit to the location. In some embodiments, the media guidance application extracts a time from the time stamp from a media in the user generated media, compares the extracted time to the period of time to determine whether the extracted time is within the period of time, and in response to determining that the extracted time is within the period of time, classifies the media associated with the extracted time to the first set of media. For example, the media guidance application may extract a saved time stamp from each media element in the user generated media and compare the time stamp to the range of the time period of the trip of Dubai. Upon determining that the time stamp of the media element is within the period of time of the trip, the media guidance application selects the media element in a second set to determine the location of the media.

Sometimes, the user may be accompanied by friends or relatives on a trip. The media guidance application, from the itineraries of the user, determine other people that may have accompanied the user and searches their databases for pictures of the user on the trip. In some embodiments, the media guidance application determines from itineraries of the user's trips, a second user that accompanied the user to the location, and searches through media generated by the second user to retrieve a third set of media that corresponds to the location. For example, the media guidance application may determine from itineraries of the user, that the user was accompanied by three friends. The media guidance application extracts media generated by the other three friends in the period of time.

From the media of the three users, the media guidance application determines a presence of the user and a landmark (e.g., building 'Burj Khalifa') in the media. In some embodiments, the media guidance application determines a presence of the user and a presence of a landmark specific to the location in components of the third set of media, and based on the determining, generates for consumption, the third set of media along with the second set of media. In some embodiments, the media guidance application also determines whether the three users have provided the user with access to their media. The media guidance application may determine from the media of the other three users, media containing the user and 'Burj Khalifa' and based on that include the media from the other friends in the supplemental content generated.

In some aspects of the disclosure, systems and methods are provided herein to generate a comparative view of a video asset being consumed by a user with generated supplemental content, where the supplemental content is generated using user generated content related to a location referenced in the video asset. For example, the media guidance application may be playing a program related to a location (e.g., a news report about Burj Khalifa) and the media guidance application may extract media of the user when the user visited location and generate both the media asset and the media generated by the user simultaneously so that the user could compare the media of the location (e.g., Burj Khalifa in the program and Burj Khalifa in the user generated media).

To this end and others, in some aspects of the disclosure, the media guidance application may present a frame of the video asset to the user at a user device. For example, the user may be consuming a television program related to the construction challenges of 'Burj Khalifa'. The media guidance application may generate supplemental content related to 'Burj Khalifa' using media generated by the user.

The media guidance application determines a location at which contents depicted in an image that is presented in the frame resides. For example, the media guidance application may determine that the program the user is consuming is related to 'Burj Khalifa' in Dubai. The media guidance application may determine the location from the program to be 'Burj Khalifa'.

The media guidance application now determines whether the user visited the determined location (e.g., Burj Khalifa). The media guidance application may determine whether the user has visited a vicinity of the location by searching through a profile related to the user. For example, the media guidance application may determine whether the user visited the Dubai from the user profile that may contain the travel itineraries of the user.

In response to determining that the user visited the vicinity of the location, the media guidance application extracts from the frame a first portion of the frame that includes the image and excludes a second portion of the frame that does not include the image. For example, the program the user may be watching is a news report on a sand storm in Dubai and the program may contain an image of the Burj Khalifa in the sandstorm. The media guidance application may extract the picture of the Burj Khalifa in the sandstorm from the news channel by removing the news ticker displayed at the bottom of the television screen.

The media guidance application searches through user generated media in a period of time when the user is determined to have visited the location to retrieve a set of media that corresponds to the location. For example, the media guidance application may determine a set of media that the user generated on his trip to Dubai. The media guidance application may limit their search of media generated to the time period of the trip of the user to Dubai. The time period of the trip may be determined by analyzing the calendar associated with the profile of the user. The location of the media generated may be determined based on geotags stored along with the media at the time of generation.

The media guidance application performs an image comparison between a personal image within the set of media and the first portion. For example, the media guidance application compares an image generated by the user in Dubai to the image of Burj Khalifa to determine if the images are similar.

In some embodiments, the media guidance application determines, based on the image comparison, whether there is a match between the personal image and the first portion and in response to determining a match, the media guidance application generates a comparative view of the first portion with the personal image. For example, a match between the images may be a matching of a certain minimum threshold percentage of the image. A match may also be determined if both the images (the personal image and the image from the news program) contain a portion of a landmark (e.g., building Burj Khalifa) associated with the location (e.g., Burj Khalifa).

In some embodiments, the media guidance application displays the first portion and the personal image. For example, the media guidance application upon determining that the images (the personal image and the image from the news program) may be displayed together on the device the user is watching the program.

In some embodiments, the media guidance application may present the travel itinerary with the personal image to be presented to the user. The itinerary may be associated with the destination that is part of the itinerary. This allows the user a way to identify the location of the personal image.

In some embodiments, the media guidance application determines a landmark present in the first portion, searches for the presence of the landmark in the personal image within the set of media, and in response to determining a presence of the landmark in the personal image compares the landmark in the personal image to the landmark in the first portion. For example, the media guidance application detects an image of the Burj Khalifa in a sandstorm from the news program and detects the presence of Burj Khalifa in media generated by the user during the user's trip to Dubai. The media guidance application compares the user's image and the extracted image from the news program and presents the comparison for the user's benefit.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods described herein for automatically supplemental to content being consumed by a user via a media asset. For example, a user may be watching a program relating to the construction of Burj Khalifa in Dubai, and a media guidance application may be configured to create supplemental content related to the program using media generated by the user during their trip to Dubai.

Figure 1:
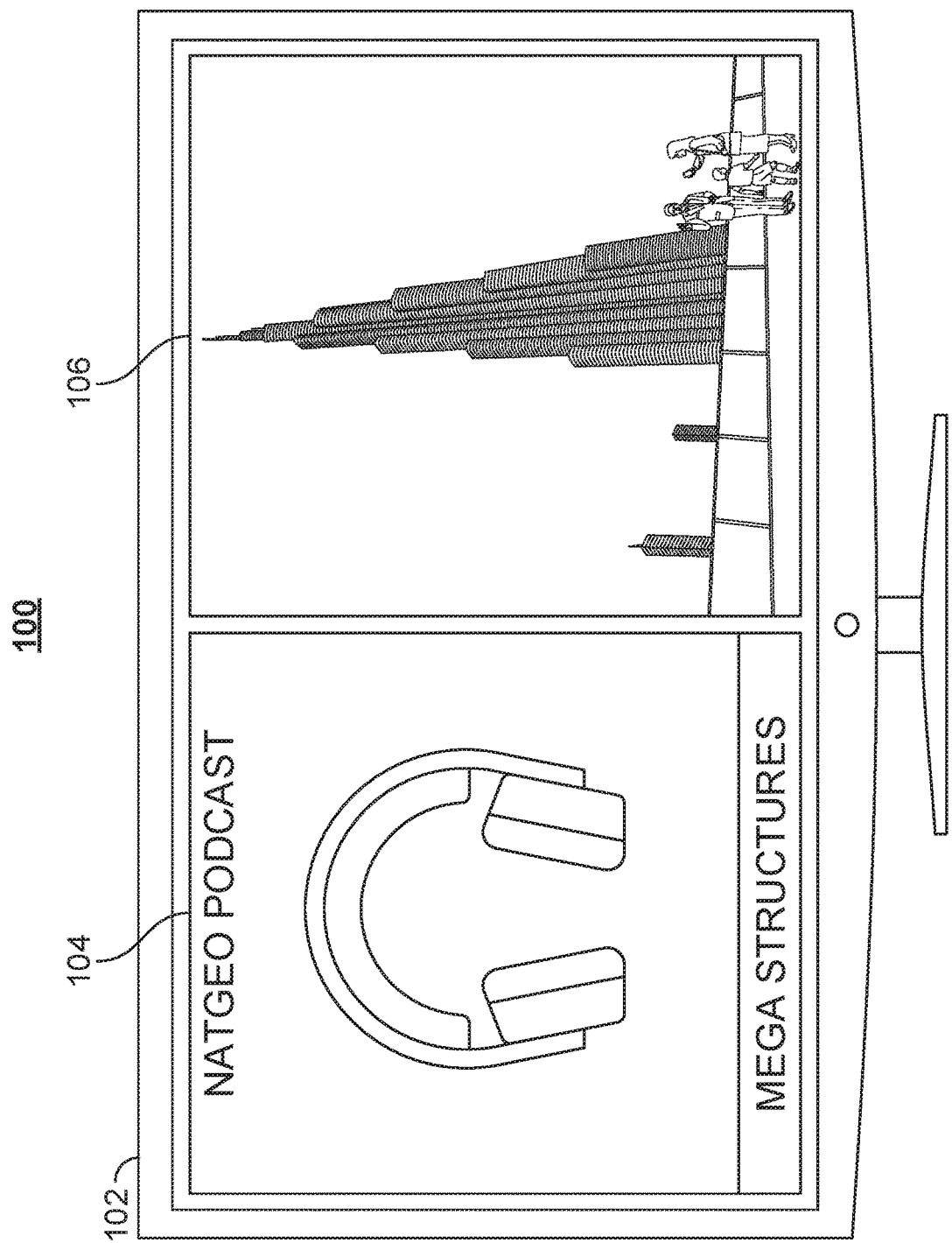
FIG. 1 shows an illustrative example of supplemental content being generated, in accordance with some embodiments of the disclosure.

FIG. 1 shows an illustrative example of supplemental content being generated, in accordance with some embodiments of the disclosure. FIG. 1 contains a user device 102 on which the user is consuming a media asset 104. In some embodiments, user device 102 may be a television, a phone, a tablet, or any other handheld device. Media asset 104 in FIG. 1 is a podcast. In some embodiments, media asset 104 may be a television program, a recorded program, or a any other program. For the purposes of illustration, media asset 104 in FIG. 1 is a podcast 'MEGASTRUCTURES' by National Geographic. 'MEGASTRUCTURES' is a show that discusses the construction challenges of various gigantic structures around the world. The user may be listening to an episode of 'MEGASTRUCTURES' where the podcast discusses talking about the construction challenges of 'Burj Khalifa' in Dubai. Region 106 in FIG. 1 depicts a frame where supplemental content created based on media (images, videos, audio) generated by the user that refers to the subject matter discussed in podcast at media asset 104 is displayed. For illustrative purposes, in this figure, region 106 depicts image of the user standing in front of Burj Khalifa, from a trip that the user made to Dubai.

In some embodiments, the supplemental content may include a collection of photos and videos generated by the user on their trip to Dubai and may be displayed along with media asset 104 being consumed by the user as shown in FIG. 1. In some embodiments, the user may be provided an alert when the supplemental content generated and ready for consumption while the user is consuming media asset 104. In some embodiments, the user may decide to watch the supplemental content in region 106 after the user has finished consuming media asset 104. In some embodiments, the user may decide to pause media asset 104 to consume the supplemental content being generated at region 106, before continuing with media asset 102.

In order to automatically generate the supplemental content, the media guidance application may generate a presentation of media asset 104 to the user. For example, the media guidance application may generate a program on the user device 104 associated with the user. The program may be one of a television program, a podcast, a song or in any other format consumed by the user.

The media guidance application determines a location being discussed in media asset 104. In some embodiments, the media guidance application may determine a location discussed in the media asset by analyzing metadata associated with media asset 104. In some embodiments, media asset 104 may be tagged with a structure being discussed, e.g. Burj Khalifa, and the media guidance application may use the name of the structure from the tag to determine a location of the structure. For example, the media guidance application may use the tag of Burj Khalifa from media asset 104 in a different application to determine a location of Burj Khalifa on a map using a map application, e.g. Google Maps. In some embodiments, the media guidance application may determine geographical coordinates of the determined location from the map application being used to determine the location.

In some embodiments, the media guidance application may determine a location being discussed in media asset 104 by analyzing audio of the media asset 104. The media guidance application may parse the audio of media asset 104 and extract the various phrases uttered by various speakers in media asset 104. The media guidance application may compare the extracted utterances to an existing database of phrases to determine a location being discussed in media asset 104. From the referenced location in media asset 104, the media guidance application may input the location in a map application to determine geographical coordinates of the location. For example, in the podcast of National Geographic, the media guidance application may analyze the audio of the podcast, and determine that utterances in the podcast contain phrases referring to 'Burj Khalifa' by comparing the utterances to a database. The database of utterances may contain common phrases from analyzing many audio phrases and associating the phrases to various locations that may be referenced in the phrases. For example, the phrase 'tallest building in the world' may automatically be associated with 'Burj Khalifa' in Dubai.

In some embodiments, at the time of generation of any media element by a user, the media element is saved with a time stamp and a geotag. For example, when a user may take a picture from their phone, the camera application may extract a current location and a current time from the phone and store the location as a geotag and the time as a timestamp along with the picture. In some embodiments, the location in the geotag may be stored as a phrase, and as latitude and longitude coordinates for reference later. In some embodiments, the time stamp stored along with the picture may contain a date along with the time of the day that the picture was captured at.

In some embodiments, the location saved in the geotag may be used by the media guidance application to calculate a vicinity of the location. For example, the media guidance application, from the geotag of Burj Khalifa determine that the vicinity of Burj Khalifa may be 'Downtown Dubai', 'Sheikh Zayed Road'. In some embodiments, the media guidance application may determine an area around the location to be within the vicinity of the location. For example, the media guidance application may use the geographical coordinates of Burj Khalifa, and determine a radius of 2 miles around the geographical coordinates to be within the vicinity of the location. In some embodiments, the vicinity of a location may include the city that is part of the location for the purposes of determining whether the user has determined. For example, the media guidance application may determine that the city in the vicinity of the location of Burj Khalifa, is 'Dubai'.

In some embodiments, the media guidance application determines whether the user visited the determined location (e.g., Burj Khalifa). The media guidance application starts with determining whether the user has visited a vicinity of the location. For example, the media guidance application may determine whether the user has visited the vicinity (e.g., Dubai) of the location (e.g., Burj Khalifa). In order to determine whether the user has visited a city, the media guidance application may retrieve a history of physical locations the user has visited from a profile of the user. The user profile may contain the travel itineraries of the user, which the media guidance application may search to determine whether the user visited a vicinity of the location of Burj Khalifa.

The media guidance application may determine itineraries of a user's travel from a calendar associated with the user profile. In some embodiments, the media guidance application extracts the user's calendar from the user's profile, determines from the user's calendar, events that indicate travel of the user from one place to another, determines from the events, itineraries of the user's trips to various physical locations, and determines from the itineraries, the period of time, during which the user visited the physical location. For example, the media guidance application determines from a user's calendar that the user blocked out January 19-January 28 to travel to Dubai. The media guidance application may determine a travel itinerary associated with the exact dates of their travel. From the exact dates and arrival times of the flight, the media guidance application may determine a time period that the user spent in Dubai.

In some embodiments, the media guidance application may determine itineraries of the user from an application the user may have used to booked travel. For example, the user may use an application like Expedia to book tickets and make hotel reservations and the media guidance application may have access to the itineraries of the user from the Expedia application. In some embodiments, the user may make a rental car reservation or a bus or train reservation instead of a flight reservation to travel to a particular location. In some embodiments, the media guidance application may also determine itineraries from the email account of the user. Receipts of all reservations made may be sent to the email account to the user. For example, every travel plan made by the user may be accompanied by reservations that may be emailed to the user. The media guidance application may access the email of the user to infer any itineraries by the media guidance application. From the itineraries of trips to various locations of the user, the media guidance application may determine whether a user has made a trip to a determined location. For example, in the case of the National Geographic podcast, the media guidance application may analyze from emails of a user whether the user has made a trip to the vicinity Dubai of the location Burj Khalifa.

The media guidance application determines a time period of the visit to the vicinity of the determined location (e.g., Dubai). In response to determining that the user has visited the vicinity of the location referenced in the media asset, the media guidance application determines from the history, a period of time during which the user visited the vicinity of the location referenced in the media asset. For example, the media guidance application may determine, from the travel itineraries of the user, whether the user has visited 'Dubai', which is determined to be in the vicinity of 'Burj Khalifa'. In this example, the media guidance application may determine that the user had a trip to Dubai from Jan. 19, 2018-Jan. 28, 2018. From the itineraries, the media guidance application may be able to determine an actual arrival time and a departure of the user at a location. The period of time may be modified to accommodate for the arrival and departure times of the user at the location.

Based on the determined period of time, the media guidance application only has to search through user generated media in that determined period of time. In today's age, there is a large amount of media that is constantly generated by the user in the form of images, videos, audio files etc. By restricting the search of user generated media to a particular period of time rather than an open search, the media guidance application is able to perform a faster and more efficient search to generate supplemental content.

The media guidance application begins searching for relevant personal media through personal media generated by the user when the media guidance application determines that the user has visited the vicinity (e.g., Dubai) of the determined location (e.g., Burj Khalifa). The media guidance application searches through media generated by the user to retrieve a first set of the media having a time stamp within the determined period of time. For example, every element of media (e.g., photos, videos, audio, text files) generated by the user may be time stamped at the time of generation. The media guidance may only search a database containing media generated by the user between the dates of the trip using the time stamps associated with the user generated media.

In some embodiments, media generated by the user may be organized by locations visited by the user. For example, the media guidance application may group all images and videos with a geolocation within the vicinity of the city 'Dubai' together. In such embodiments, while searching for media related to a determined location, the media guidance application only needs to search the media related to the vicinity of the location. For example, while searching for media related to 'Burj Khalifa', media guidance application may only search through pictures grouped together based on the geotag of Dubai. In such embodiments, the media guidance application may not need to search the entire database.

The media guidance application compares the time stamp of each media in the user generated media asset to the determined time period of the user's visit to the location. In some embodiments, the media guidance application extracts a time from the time stamp from a media in the user generated media, compares the extracted time to the period of time to determine whether the extracted time is within the period of time, and in response to determining that the extracted time is within the period of time classifies the media associated with the extracted time to the first set of media. For example, the media guidance application may extract a saved time stamp from each media element in the user generated media and compare the time stamp to the range of the time period of the trip of Dubai. Upon determining that the time stamp of the media element is within the period of time of the trip, the media guidance application selects the media element in a second set to determine the location of the media.

From the user generated media that is within the period of time of the user's trip to the vicinity of the location (e.g., Dubai), the media guidance application determines media associated with the location (e.g., Burj Khalifa). The media guidance application determines from the first set of retrieved media, a second set of media that corresponds to the location, and generates for consumption the second set of media. For example, the media guidance application may search the media generated within the days of the trip to Dubai for media (e.g., photos, pictures, audio, and text) for media that corresponds to Burj Khalifa. The media guidance application may put together all the media that fits the search criteria and provide the generated supplemental content to the user for consumption.

In order to determine that media generated by the user that is part of the first set within the determined time period is associated with a determined location, the media guidance application examines a geotag saved along with the media and compares the determined location to the location (e.g., 'Burj Khalifa') determined from the media asset (e.g., TV program). In some embodiments, the media guidance application extracts the geotag from a media in the first set of media, determines a respective location of the media from the extracted geotag, compares the respective location of the media in the first set of media to the location; and based on the comparing, determining whether the respective location of the media in the first set of media is within a predetermined distance from the location. For example, the media guidance application may determine from a geotag associated with an image that the location of the image is 'The Address' hotel in Dubai. The media guidance application then computes a distance between the 'The Address' hotel and 'Burj Khalifa'. The media guidance application may determine the distance to be 0.5 miles, which may be within a threshold distance of 2 miles from the determined location of 'Burj Khalifa'.

The media guidance application determines a presence of a landmark associated with the location in the media that is within the threshold distance of the location. In some embodiments, in response to determining that the respective location is within the predetermined distance, the media guidance application analyzes each media associated with the respective location to determine a presence of a landmark specific to the location, and in response to determining the presence of the landmark specific to the location, the media guidance application classifies the media to the second set of media that corresponds to the location. For example, the media guidance application, in the media asset with the geotag of the 'The Address' hotel, may search for a presence of a portion of the building 'Burj Khalifa' that is associated with the location of 'Burj Khalifa'.

The media guidance application may determine an order to arrange the multiple user generated media elements that are related to the location (e.g., Burj Khalifa). In some embodiments, the media guidance application arranges each media in the second set of media that corresponds to the location in an order based on a distance computed between the respective location of each media and the location. For example, the media guidance application may identify multiple pictures of the user at multiple locations in the vicinity of 'Burj Khalifa'. The media guidance application may arrange them in an ascending order of the distance. The picture closest to the 'Burj Khalifa' may be first and the picture furthest from the 'Burj Khalifa' within the predetermined threshold of distance may be presented last.

In some embodiments, the media guidance may arrange the selected media elements in another order that may be specified by the user before the generation of the supplemental content.

Figure 2:
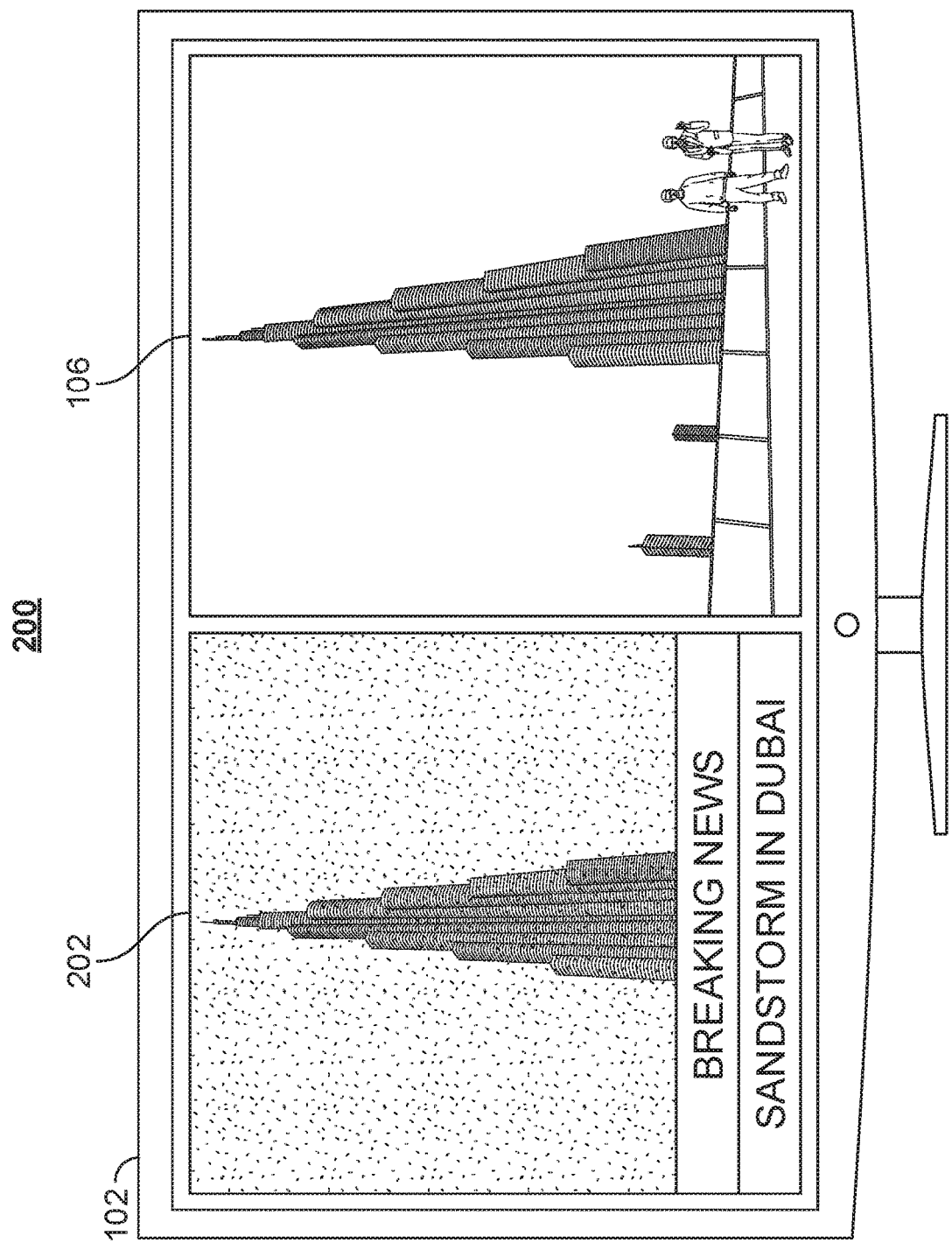
FIG. 2 shows an illustrative example of supplemental content being generated, in accordance with some embodiments of the disclosure.

FIG. 2 shows an illustrative example of supplemental content being generated, in accordance with some embodiments of the disclosure. FIG. 2 is similar to FIG. 1, except for a type of media asset 202 being consumed by the user. In some embodiments, media asset 202 being consumed by the user may be a news report on a television program (e.g., that discusses a sandstorm in Dubai). The media guidance application may be able to determine that the location being discussed in the media asset may be Burj Khalifa by analyzing metadata associated with the media asset. For example, the media guidance application may determine from information in the program guide that the news report discusses a sandstorm at Burj Khalifa. In some embodiments, the media guidance application may analyze the frame of the media asset 202 on the screen to determine the location discussed in the media asset. For example, the media guidance application may analyze the text on the screen 'SANDSTORM IN DUBAI' to determine a location that is being discussed in the media asset.

Upon determining a location in the media asset, the media guidance application may determine whether the user has visited the location as described in FIG. 1. Upon determining that the user has visited the location, the media guidance application extracts from the frame a first portion of the frame that includes the image and excludes a second portion of the frame that does not include the image. For example, the program the user may be watching is a news report on a sand storm in Dubai and the program may contain an image of the Burj Khalifa in the sandstorm. The media guidance application may extract the picture of the Burj Khalifa in the sandstorm from the media asset 202 by removing the news ticker displayed at the bottom of the display of user device 102.

The media guidance application searches through media generated by the user in a period of time visited by the user. The period of time to search is determined from information related to a profile associated with the user as explained in FIG. 1. The media guidance application may search through the media generated by the user in the determined period of time and determine whether a personal image in the user generated media matches a portion of the extracted image from media asset 202 being consumed by the user. For example, the media guidance application may determine from the portion of the extracted image from media asset 202 that the portion includes a snapshot of Burj Khalifa. Based on this determination, the media guidance application may search for pictures with portions of Burj Khalifa in them in the user generated personal media.

In some embodiments, the media guidance application may determine the presence of Burj Khalifa in a personal image or in a portion of the image provided by media asset 202 by dividing the image into different portions and comparing the composition of colors and contours present in each portion with an expected color and contour composition. The expected color and contour composition may be extracted from the internet based on an object detected in the image. In some embodiments, the media guidance application may compare the color and contour composition of the smaller portion of the image to aa database of color and contour composition to determine the presence of an object in the image. In some embodiments, the media guidance application may infer the presence of a landmark based on information from the metadata associated with the media asset. In such examples, the media guidance application may determine a contour and color composition of the determined objects from the internet.

In some embodiments, the media guidance application may determine whether the personal image in the user generated media and the portion of the image provided from media asset 202 match. In some embodiments, a match may be performed by determining whether a portion of the same landmark in the picture is present in both images. For example, a match between the images may be a matching of a certain minimum threshold percentage of the image. A match may also be determined if both the images (the personal image and the image from the news program) contain a portion of a landmark (e.g., building Burj Khalifa) associated with the location (e.g., Burj Khalifa). For examples, the media guidance application may determine that a portion of the image from media asset 202 contains a portion of the Burj Khalifa. The media guidance application then looks for Burj Khalifa in personal media generated by the user. In some embodiments, the media guidance application may search for the pictures within a predetermined distance from Burj Khalifa that may include a portion of Burj Khalifa. For example, the user may take a picture in front of a different landmark (e.g., Dubai Creek) within the predetermined threshold distance from Burj Khalifa, that may include a portion of the Burj Khalifa in the background.

The media guidance application may be programmed to detect a particular threshold of similarity between images to classify them as matched. In some embodiments, the similarity may be determined based on a similarity of a number of pixels in the image. In some embodiments, the similarity may be determined if the images contain a portion of the landmark. In some embodiments, a similarity between the images may be determined based on a determined distance between the images. In such examples, determining the distance between the images includes determining a location of the personal image by examining a geotag associated with the personal image. The process of saving the personal image with a geotag is described with respect to FIG. 1. Additionally, the media guidance application may determine a location of the object identified in media asset 202. In some embodiments, the media guidance application may determine a match between the images if the determined location of the personal image is within a predetermined threshold distance from the determined location of the landmark in the media asset 202.

In some embodiments, upon determining a similarity between the personal image and the portion of the image from media asset 202, the media guidance application presents the personal image as comparative content. In some embodiments, the user may choose to review comparative content simultaneously as media asset 202 is being displayed. In some embodiments, the user may be notified of comparative content and the user may choose to view comparative content after media asset 202 has completed.

In some embodiments, the user may be accompanied by friends or relatives on a trip. The media guidance application, from the itineraries of the user, determine other people that may have accompanied the user and searches their databases for pictures of the user on the trip. In some embodiments, the media guidance application determines from itineraries of the user's trips, a second user that accompanied the user to the location, and searching through media generated by the second user to retrieve a third set of media that corresponds to the location. In some embodiments, the media guidance application from a profile of the user may determine whether the user has been provided access to media of the second user. For example, the user and the second user may be friends on a social media platform, that allows them to access each other's media. In a second example, the user and the second user may create a shared album to put in pictures of a trip they make together. The media guidance application may search such platforms for user generated media related to the location in a media asset accessed by the user to generate supplemental or comparative content. For example, the media guidance application may determine from itineraries of the user, that the user was accompanied by three friends. The media guidance application extracts media generated by the other three friends in the period of time accessible to the first user.

From the media of the three users, the media guidance application determines a presence of the user and a landmark (e.g., building 'Burj Khalifa') in the media. In some embodiments, the media guidance application determines a presence of the user and a presence of a landmark specific to the location in components of the third set of media, and based on the determining, generates for consumption, the third set of media along with the second set of media and they have provided the user with access to their media. The media guidance application may determine from the media of the other three users, media containing the user and 'Burj Khalifa' and also include the media from the other friends in the supplemental content generated.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
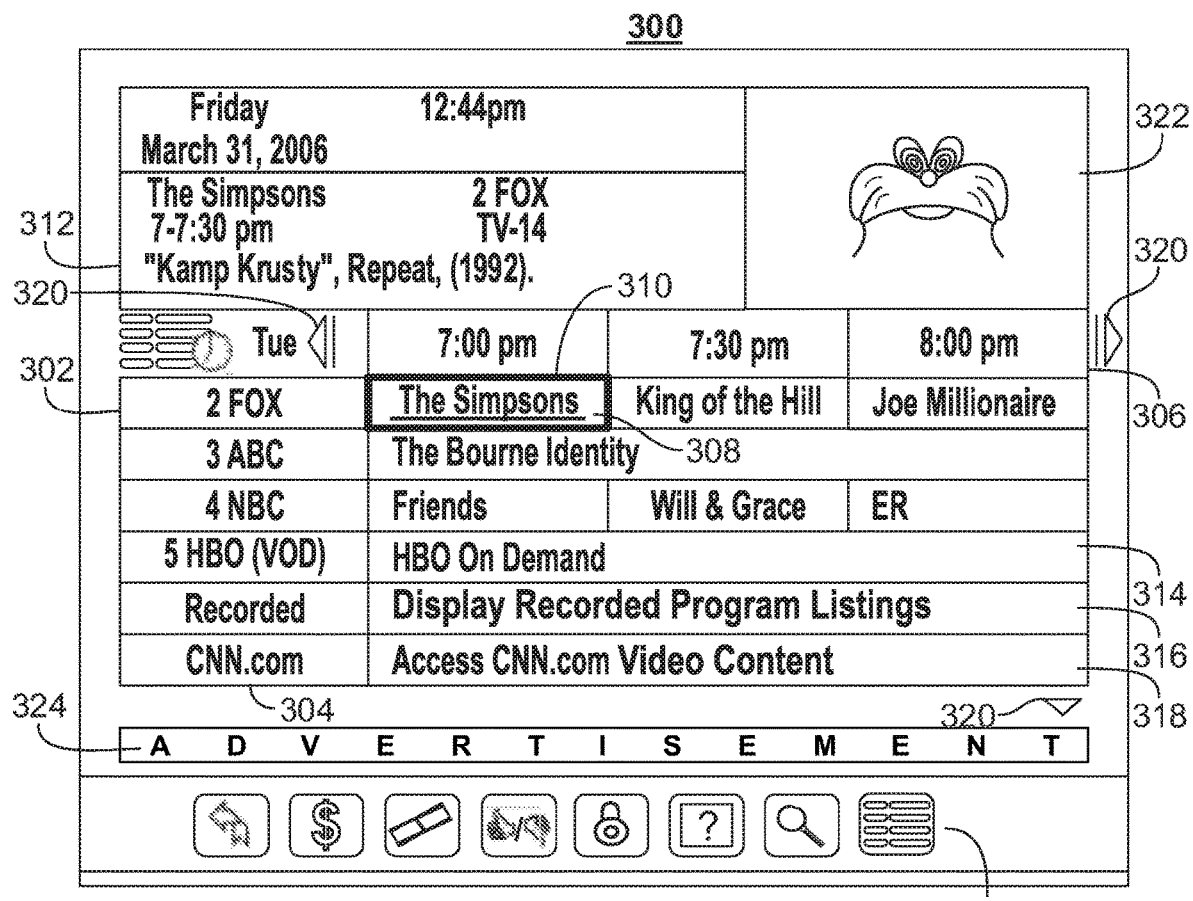
FIG. 3 shows an illustrative embodiment of a display screen that may be used to provide media guidance application listings and other media guidance information, in accordance with some embodiments of the disclosure.
Figure 4:
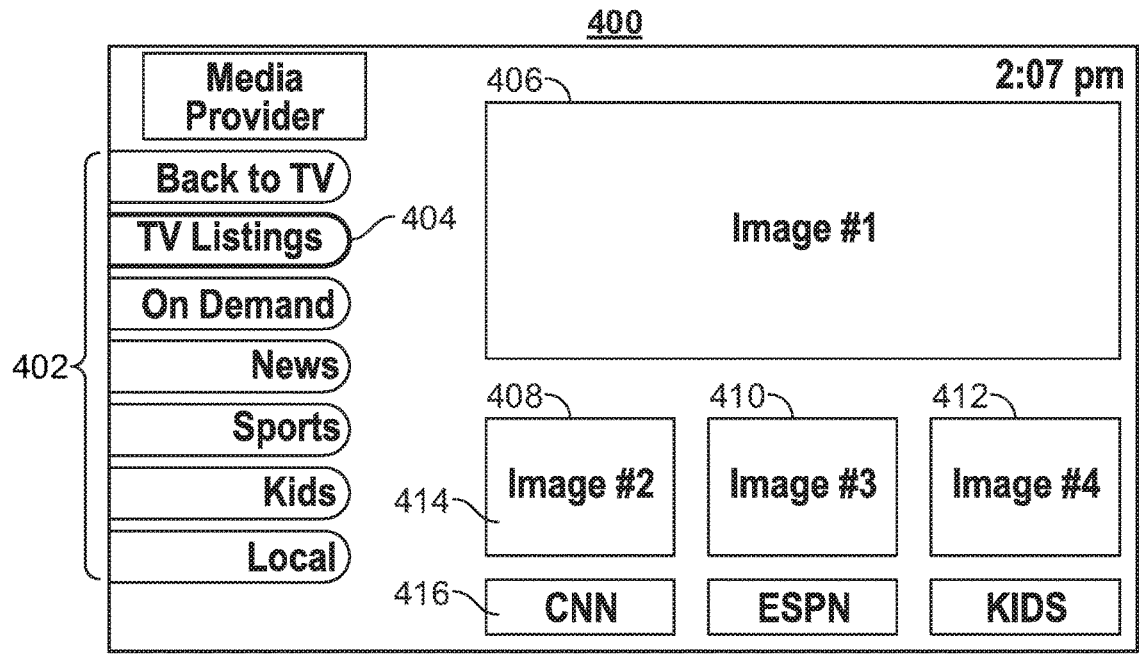
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
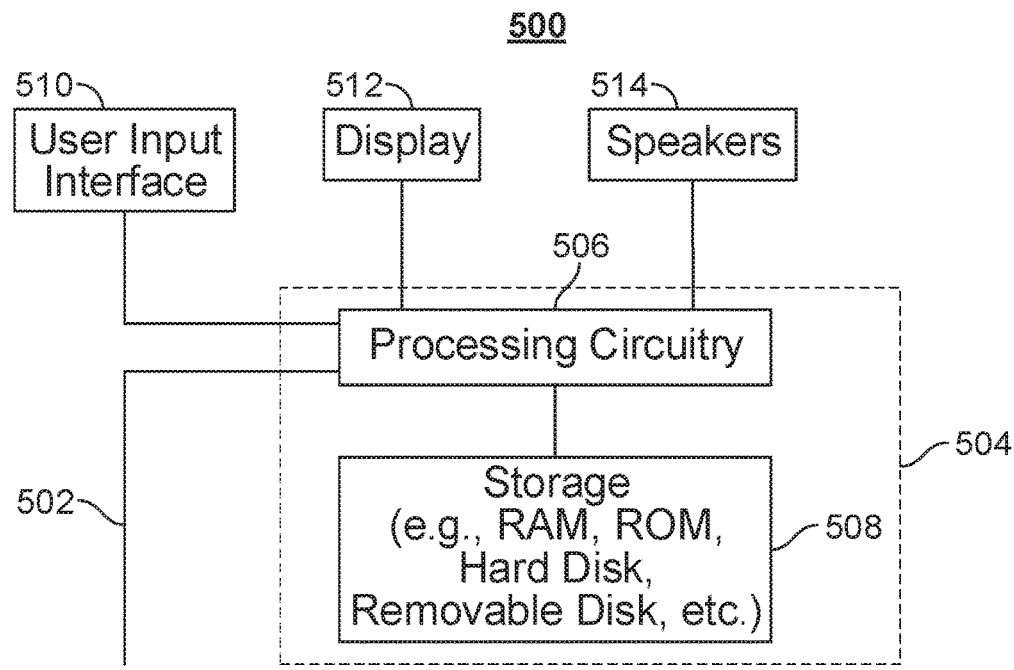
FIG. 5 is a block diagram of an illustrative user equipment (UE) device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
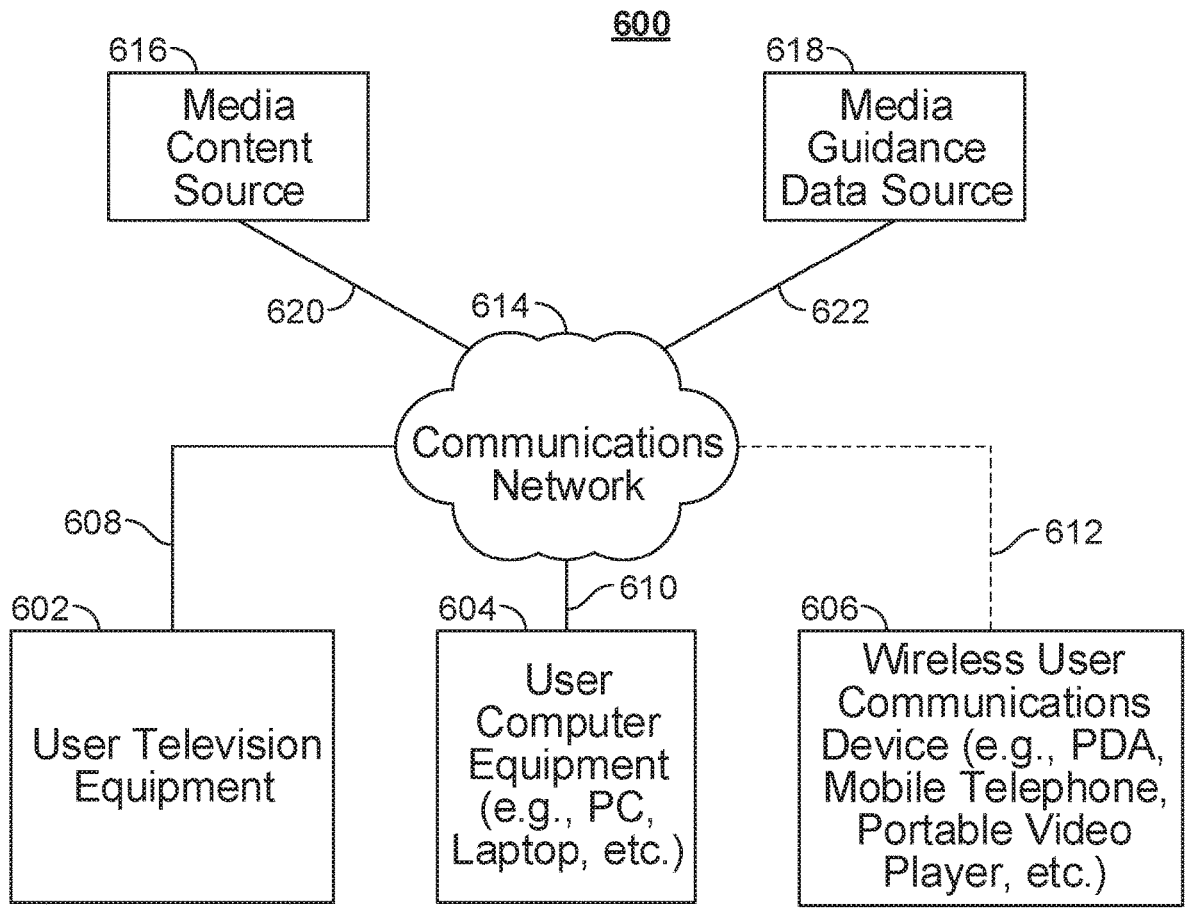
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

System 600 may also include an advertisement source 624 coupled to communications network 614 via a communications path 626. Path 626 may include any of the communication paths described above in connection with paths 608, 610, and 612. Advertisement source 624 may include advertisement logic to determine which advertisements to transmit to specific users and under which circumstances. For example, a cable operator may have the right to insert advertisements during specific time slots on specific channels. Thus, advertisement source 624 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 624 may be configured to maintain user information including advertisement-suitability scores associated with user in order to provide targeted advertising. Additionally, or alternatively, a server associated with advertisement source 624 may be configured to store raw information that may be used to derive advertisement-suitability scores. In some embodiments, advertisement source 624 may transmit a request to another device for the raw information and calculate the advertisement-suitability scores. Advertisement source 624 may update advertisement-suitability scores for specific users (e.g., first subset, second subset, or third subset of users) and transmit an advertisement of the target product to appropriate users.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition, or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to cause by. For example, a first action being performed directly in response to a second action may not include interstitial steps between the first action and the second action.

Figure 7:
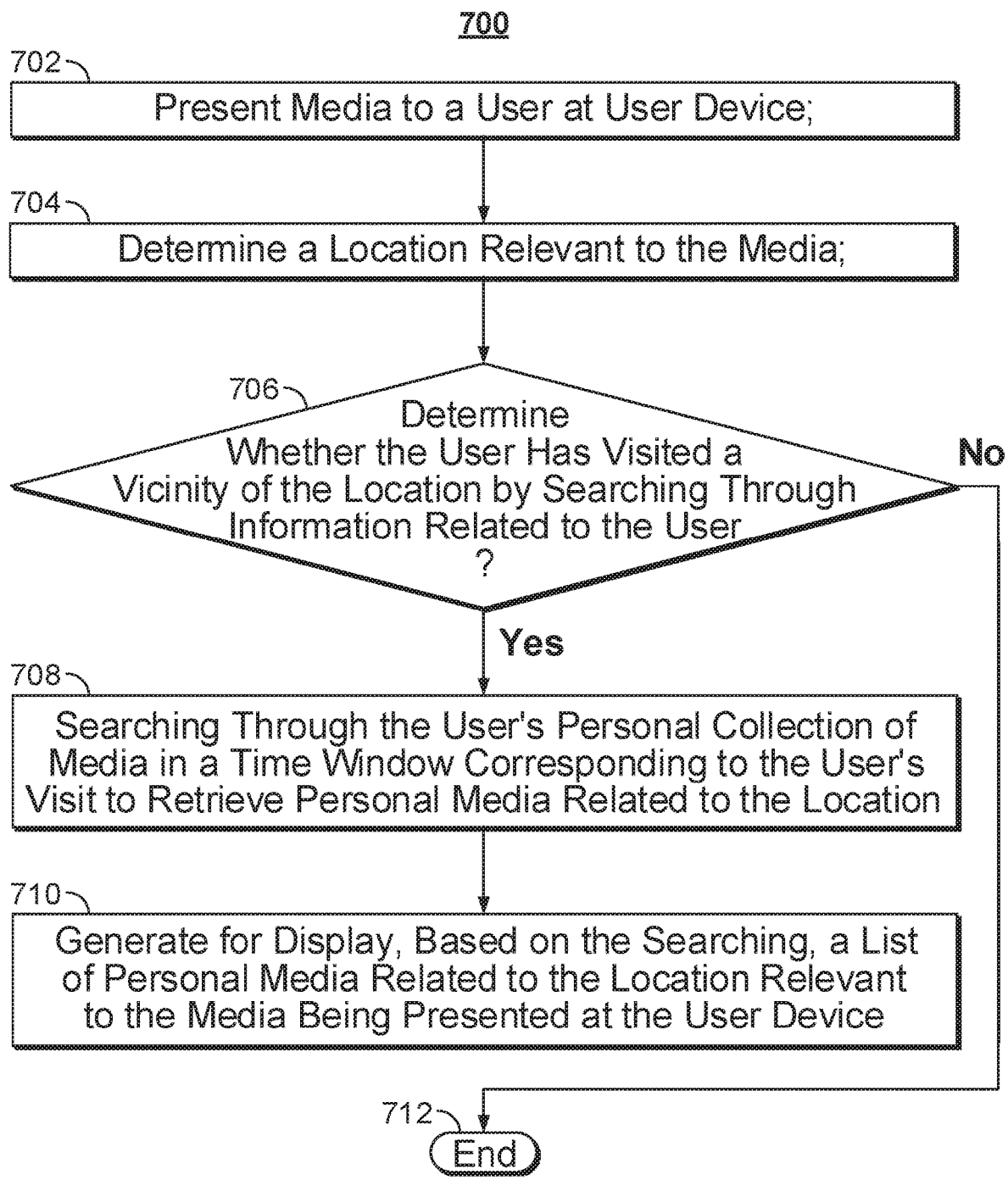
FIG. 7 depicts an illustrative flowchart of a process for generating supplemental content for a media asset based on content generated by the user that relates to a location referenced in the media asset, in accordance with some embodiments of the disclosure.

FIG. 7 depicts an illustrative flowchart of a process for generating supplemental content for a media asset based on content generated by the user that relates to a location referenced in the media asset, in accordance with some embodiments of the disclosure. Process 700 may be executed by control circuitry 504 (e.g., in a manner instructed to control circuitry 504 by the media guidance application). In addition, one or more steps of process 700 may be incorporated into or combined with one or more steps of any other process or embodiment (e.g., as described in relation to FIGS. 8-14).

Process 700 begins at 702, where control circuitry 504 presents media to a user at a user device. For example, the control circuitry may present a media asset 104 on a display 412 of user device 102. In some embodiments, the media asset may be one of a television program, a podcast, a song or in any other format consumed by the user. In this example, the media guidance application may present a program related to the construction challenges of Burj Khalifa.

At 704, control circuitry 504 determines a location relevant to the media. For example, the media guidance application may determine a location referenced in the media by analyzing different portions of the media application. In some embodiments, the media guidance application may determine a location referenced in the audio portion of media asset 104 by comparing utterances in the audio portion to sample utterances in a database in storage 508 to determine a location referenced in media asset 104. In this example, the media guidance application may determine that a location referenced in media asset 104 may be 'Burj Khalifa'.

At decision block 706, control circuitry 504 determines whether the user has visited a vicinity of the location by searching through information related to the user. For example, the media guidance application determines whether the user has visited a vicinity of the location referenced in the media asset. For example, the media guidance application may calculate the vicinity of 'Burj Khalifa' to be 'Dubai', 'Downtown Dubai', 'Dubai Mall', 'Sheikh Zayed Road', 'The Address' etc. based on a distance from the 'Burj Khalifa'. In some embodiments, the media guidance application begins the determining by determining whether the user has visited the city 'Dubai' in the vicinity of the location 'Burj Khalifa'. In case control circuitry 504 determines that the user has visited the vicinity of the location, the process moves to 708. In case control circuitry 504 determines that the user has not visited the vicinity of the location, the process ends at 712.

At 708, control circuitry 504 searches through the user's personal collection of media in a time window corresponding to the user's visit to retrieve personal media related to the location. The media guidance application determines a time period of the visit to the vicinity of the determined location (e.g., Burj Khalifa). In some embodiments, control circuitry 508 determines a time window in which the user visited the vicinity of the location from the personal information associated with the user. In some embodiments, the media guidance application searches through media generated by the user, stored on storage 508, to retrieve a first set of the media having a time stamp within the determined time window. For example, every element of media (e.g., photos, videos, audio, text files) generated by the user may be time stamped at the time of generation. The media guidance may only search a database containing media generated by the user between the dates of the trip using the time stamps associated with the user generated media.

From the user generated media that is within the dates of the trip of the user to the vicinity of the location (e.g., Dubai), control circuitry 508 determines media associated with the location (e.g., Burj Khalifa).

At 710, for display, based on the searching, a list of personal media related to the location relevant to the media being presented at the user device. For example, the media guidance application may search the storage 508 for media generated within the days of the trip to Dubai for media (e.g., photos, pictures, audio, and text) that corresponds to Burj Khalifa. Control circuitry 504 may put together all the media that fits the search criteria and provide the generated file to the user for consumption.

Figure 8:
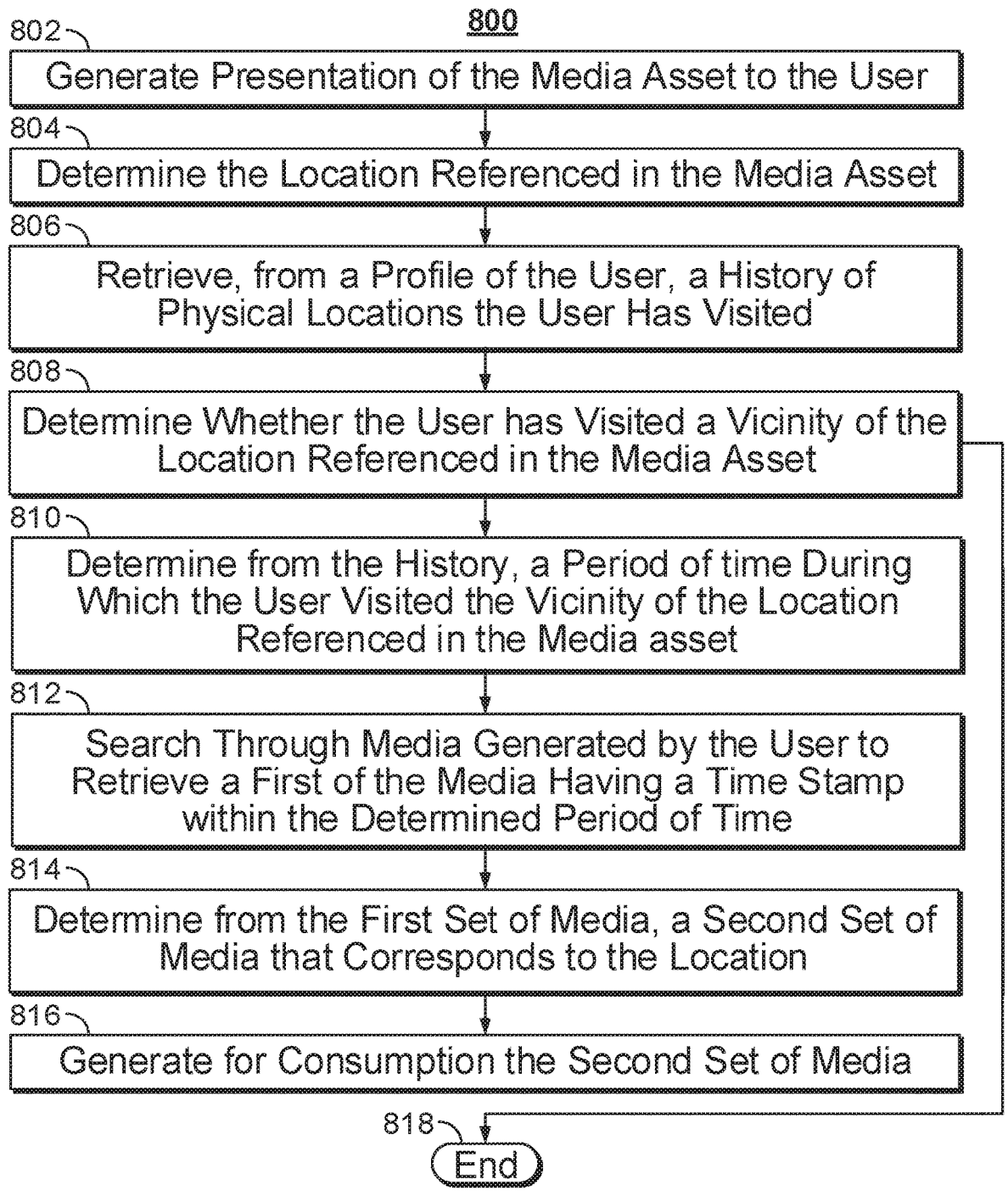
FIG. 8 depicts an illustrative flowchart of a process for generating supplemental content for a media asset being consumed by a user based on content generated by the user that relates to a location referenced in the media asset, in accordance with some embodiments of the disclosure.

FIG. 8 depicts an illustrative flowchart of a process for generating supplemental content for a media asset being consumed by a user based on content generated by the user that relates to a location referenced in the media asset, in accordance with some embodiments of the disclosure. Process 800 may be executed by control circuitry 504 (e.g., in a manner instructed to control circuitry 504 by the media guidance application). In addition, one or more steps of process 800 may be incorporated into or combined with one or more steps of any other process or embodiment (e.g., as described in relation to FIGS. 7 and 9-14).

Process 800 begins at 802 where control circuitry 504 presents a media asset to the user. For example, the control circuitry 504 may generate media asset 104 on a display 512 of device 102 associated with the user. Media asset 104 may be one of a television program, a podcast, a song or in any other format consumed by the user.

At 804, control circuitry 504 determines a location referenced in the media asset. For example, the media guidance application may determine that p the user is consuming is related to 'Burj Khalifa' in Dubai. The media guidance application may determine the location from the program to be 'Burj Khalifa'. In some embodiments, control circuitry 504 may determine the location by analyzing the metadata associated with the media asset.

At 806, control circuitry 504 retrieves a history of physical locations the user has visited from a profile of the user. For example, control circuitry 504 may search user profile on storage 508 for travel itineraries of the user, which the media guidance application may search to determine whether the user visited Dubai.

At 808, control circuitry 504 determines whether the user has visited a vicinity of the location referenced in the media asset. For example, the media guidance application may calculate the vicinity of 'Burj Khalifa' to be 'Dubai', 'Downtown Dubai', 'Dubai Mall', 'Sheikh Zayed Road', 'The Address' etc. based on a distance from the 'Burj Khalifa'. From the profile of the user, control circuitry 504 may determine whether the user has visited the vicinity of the location. In case the user has visited the vicinity of the location, process 800 proceeds to 810 to determine from the history, a period of time during which the user visited the vicinity of the location referenced in the media asset. In case the user has not visited the vicinity of the location, process 800 ends at 818.

At 810, in response to determining that the user has visited the vicinity of the location referenced in the media asset, control circuitry 504 determines from the history, a period of time during which the user visited the vicinity of the location referenced in the media asset. For example, the media guidance application may determine, from the travel itineraries of the user, whether the user has visited 'Dubai', which is determined to be in the vicinity of 'Burj Khalifa'. In this example, control circuitry 504 may determine that the user had a trip to Dubai from Jan. 19, 2018-Jan. 28, 2018 as determined from personal information associated with the user.

At 812, control circuitry 504 searches through media generated by the user to retrieve a first set of the media having a time stamp within the determined period of time. For example, every element of media (e.g., photos, videos, audio, text files) generated by the user may be time stamped at the time of generation. Control circuitry 504 may only search a database containing media generated by the user between the dates of the trip using the time stamps associated with the user generated media.

At 814, control circuitry 504 determines from the first set of retrieved media, a second set of media that corresponds to the location, and generates for consumption the second set of media. For example, control circuitry 504 may search the media generated within the days of the trip to Dubai for media (e.g., photos, pictures, audio, and text) for media that corresponds to Burj Khalifa.

At 816, control circuitry 504 generates for consumption, the second set of media. Control circuitry 504 may put together all the media that fits the search criteria and provided and generate the second set of media as supplemental content ready for consumption.

Figure 9:
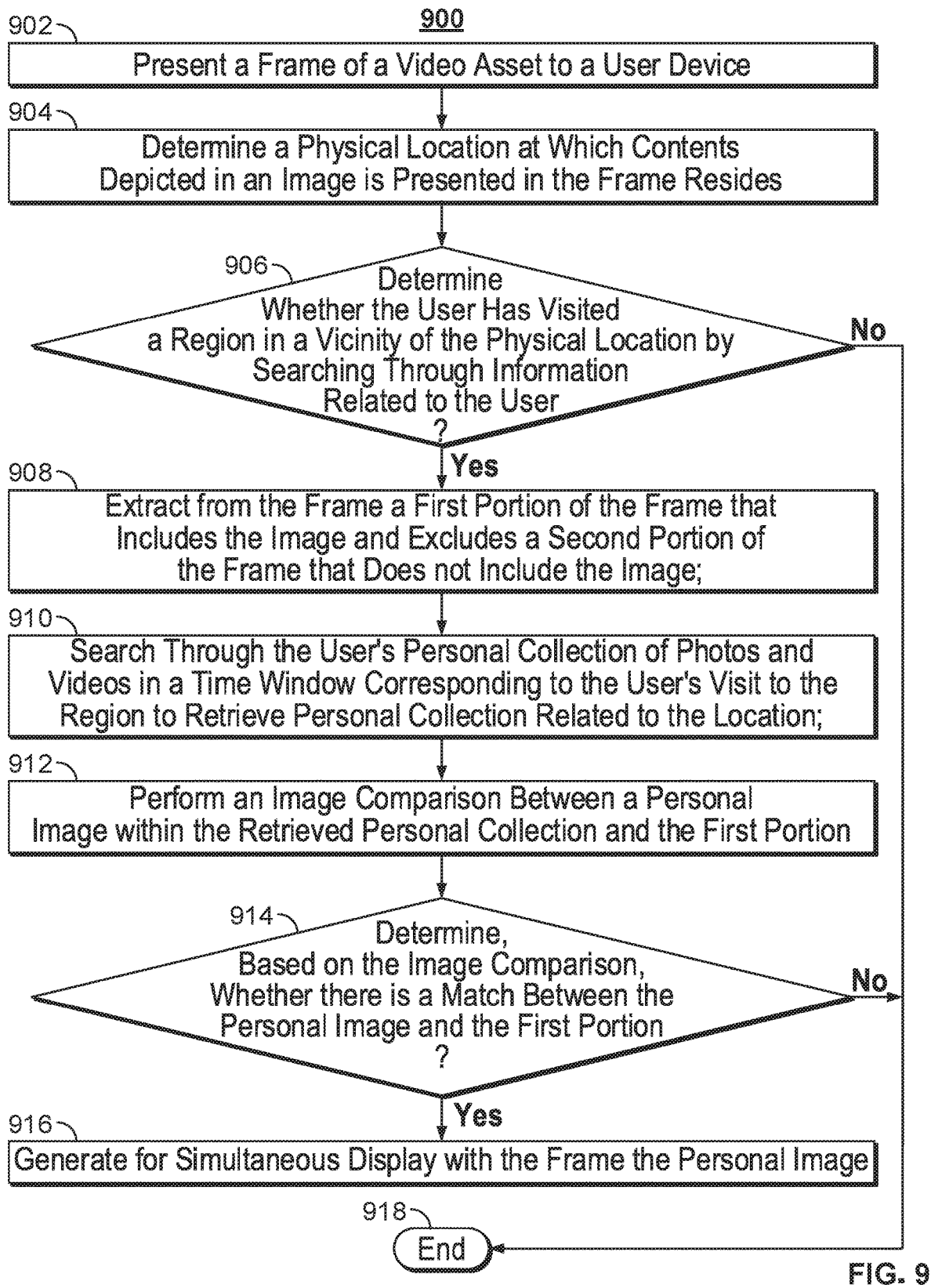
FIG. 9 depicts an illustrative flowchart of a process for generating comparative content for a media asset being consumed by a user based on content generated by the user that relates to a location referenced in the media asset, in accordance with some embodiments of the disclosure.

FIG. 9 depicts an illustrative flowchart of a process for generating comparative content for a media asset being consumed by a user based on content generated by the user that relates to a location referenced in the media asset, in accordance with some embodiments of the disclosure. Process 900 may be executed by control circuitry 504 (e.g., in a manner instructed to control circuitry 504 by the media guidance application). In addition, one or more steps of process 900 may be incorporated into or combined with one or more steps of any other process or embodiment (e.g., as described in relation to FIGS. 7-8 and 10-14).

Process 900 begins at 902 when control circuitry 504 presents a frame of a video asset to a user at a user device. For example, the control circuitry 504 may generate media asset 104 on a display 512 of device 102 associated with the user. Media asset 202 may be one of a television program, a podcast, a song or in any other format consumed by the user.

At 904, control circuitry 504 determines a physical location at which contents depicted in an image that is presented in the frame resides. For example, control circuitry 504 may determine a location referenced in the media by analyzing different portions of the media application. In some embodiments, control circuitry 504 may determine a location referenced in the audio portion of media asset 202 by perform. In this example, the media guidance application may determine that a location referenced in media asset 104 may be 'Burj Khalifa'.

In some embodiments, control circuitry 504 may be able to determine that the location being discussed in the media asset may be Burj Khalifa by analyzing metadata associated with the media asset. For example, control circuitry 504 may determine from information in the program guide that the news report discusses a sandstorm at Burj Khalifa. In some embodiments, control circuitry 504 may analyze the frame of the media asset 202 on the screen to determine the location discussed in the media asset. For example, the media guidance application may analyze the text on the screen 'SANDSTORM IN DUBAI' to determine a location that is being discussed in the media asset.

At decision block 906, control circuitry 504 determines whether the user has visited a region in a vicinity of the physical location by searching through information related to the user. Control circuitry 504 may determine whether the user has visited a vicinity of the location by searching through a profile related to the user stored in storage 508. For example, the media guidance application may determine whether the user visited the Dubai from the user profile that may contain the travel itineraries of the user. In case that the user has visited the vicinity of the location, control circuitry 504 moves process 900 to 908 where control circuitry 504 extracts from the frame a first portion of the frame that includes the image and excludes a second portion of the frame that does not include the image. In case the user has not visited the vicinity of the location, control circuitry 504 ends process 900 at 918.

At 908, control circuitry 504 extracts from the frame a first portion of the frame that includes the image and excludes a second portion of the frame that does not include the image. For example, the program the user may be watching is a news report on a sand storm in Dubai and the program may contain an image of the Burj Khalifa in the sandstorm. Control circuitry 504 may extract the picture of the Burj Khalifa in the sandstorm from the media asset 202 by removing the news ticker displayed at the bottom of the display of user device 102.

At 910, control circuitry 504 searches through the user's personal collection of photos and videos in a time window corresponding to the user's visit to the region to retrieve personal collection related to the location. For example, control circuitry 504 may determine a set of media that the user generated on his trip to Dubai. Control circuitry 504 may limit their search of media generated to the time period of the trip of the user to Dubai. The time period of the trip may be determined by analyzing the calendar associated with the profile of the user. The location of the media generated may be determined based on geotags stored along with the media at the time of generation.

At 912, control circuitry 504 performs an image comparison between a personal image within the retrieved personal collection and the first portion. In some embodiments, the media guidance application may determine whether the personal image in the user generated media and the portion of the image provided from media asset 202 match.

At decision block 914, control circuitry 504 determines, based on the image comparison, whether there is a match between the personal image and the first portion. For example, control circuitry 504 compares the personal image corresponding to the user's visit to the region and a portion of an image extracted from media asset 202 presented to the user on display 512 of user device 102. In case the images are deemed to be a match, control circuitry 504 may proceed to 916 to generate for simultaneous display with the frame the personal image. In case the images are deemed to not match, control circuitry 504 ends process 900 at 918.

At 916, control circuitry 504 in response to determining that there is a match, generates for simultaneous display with the frame the personal image. In some embodiments, a match may be performed by determining whether a portion of the same landmark in the picture is present in both images. For example, a match between the images may be a matching of a certain minimum threshold percentage of the image. A match may also be determined if both the images (the personal image and the image from the news program) contain a portion of a landmark (e.g., building Burj Khalifa) associated with the location (e.g., Burj Khalifa). For examples, the media guidance application may determine that a portion of the image from media asset 202 contains a portion of the Burj Khalifa. The media guidance application then looks for Burj Khalifa in personal media generated by the user.

Figure 10:
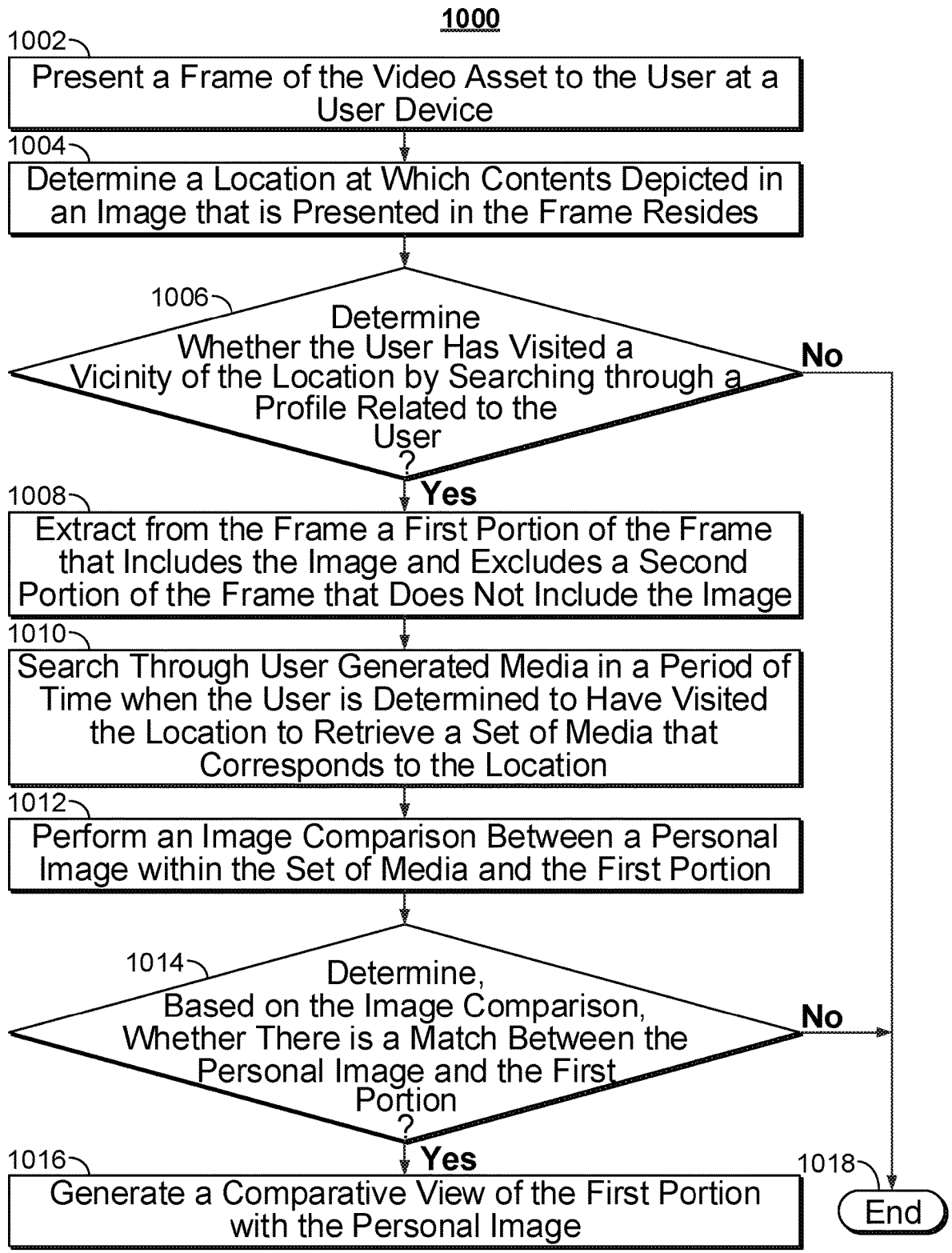
FIG. 10 depicts an illustrative flowchart of a process for generating comparative content for a media asset being consumed by a user based on content generated by the user that relates to a location referenced in the media asset, in accordance with some embodiments of the disclosure.

FIG. 10 depicts an illustrative flowchart of a process for generating comparative content for a media asset being consumed by a user based on content generated by the user that relates to a location referenced in the media asset, in accordance with some embodiments of the disclosure. Process 1000 may be executed by control circuitry 504 (e.g., in a manner instructed to control circuitry 504 by the media guidance application). In addition, one or more steps of process 1000 may be incorporated into or combined with one or more steps of any other process or embodiment (e.g., as described in relation to FIGS. 7-9 and 11-14).

Process 1000 begins at 1002, where control circuitry 504 presents a frame of the video asset to the user at a user device. For example, the user may be consuming a television program related to the construction challenges of 'Burj Khalifa'.

At 1004, control circuitry 504 determines a location at which contents depicted in an image that is presented in the frame resides. For example, control circuitry 504 may determine that the program the user is consuming is related to 'Burj Khalifa' in Dubai. Control circuitry 504 may determine the location from the program to be 'Burj Khalifa'.

At 1006, control circuitry 504 determines whether the user has visited a vicinity of the location by searching through a profile related to the user. For example, control circuitry 504 may determine whether the user visited the Dubai from the user profile that may contain the travel itineraries of the user. In case the control circuitry 504 determines that the user has visited the vicinity of the location, control circuitry 504 proceeds process 1000 to 1008 to extracts from the frame a first portion of the frame that includes the image and excludes a second portion of the frame that does not include the image. In case control circuitry 504 determines that the user has not visited the location, control circuitry 504 ends process 1000 at 1018.

At 1008, in response to determining that the user visited the vicinity of the location, control circuitry 504 extracts from the frame a first portion of the frame that includes the image and excludes a second portion of the frame that does not include the image. For example, the program the user may be watching is a news report on a sand storm in Dubai and the program may contain an image of the Burj Khalifa in the sandstorm. The media guidance application may extract the picture of the Burj Khalifa in the sandstorm from the news channel by removing the news ticker displayed at the bottom of the television screen.

At 1010, control circuitry 504 searches through user generated media in a period of time when the user is determined to have visited the location to retrieve a set of media that corresponds to the location. For example, control circuitry 504 may determine a set of media that the user generated on his trip to Dubai. The control circuitry 504 may limit their search of media generated to the time period of the trip of the user to Dubai. The time period of the trip may be determined by analyzing the calendar associated with the profile of the user. The location of the media generated may be determined based on geotags stored along with the media at the time of generation.

At 1012 control circuitry 504 performs an image comparison between a personal image within the set of media and the first portion. For example, control circuitry 504 compares an image generated by the user in Dubai to the image of Burj Khalifa to determine if the images are similar.

At 1014, control circuitry 504 determines, based on the image comparison, whether there is a match between the personal image and the first portion. In in case control circuitry 504 determines a match, control circuitry 504 proceeds process 1000 to generate a comparative view of the first portion with the personal image. In case control circuitry 504 does not determine a match, control circuitry 504 ends process 1000 at 1018.

At 1016, control circuitry 504 generates a comparative view of the first portion with the personal image. For example, a match between the images may be a matching of a certain minimum threshold percentage of the image. A match may also be determined if both the images (the personal image and the image from the news program) contain a portion of a landmark (e.g., building Burj Khalifa) associated with the location (e.g., Burj Khalifa). Control circuitry 504 may generate a comparative view of the first portion with the first image to enhance a viewer's experience.

Figure 11:
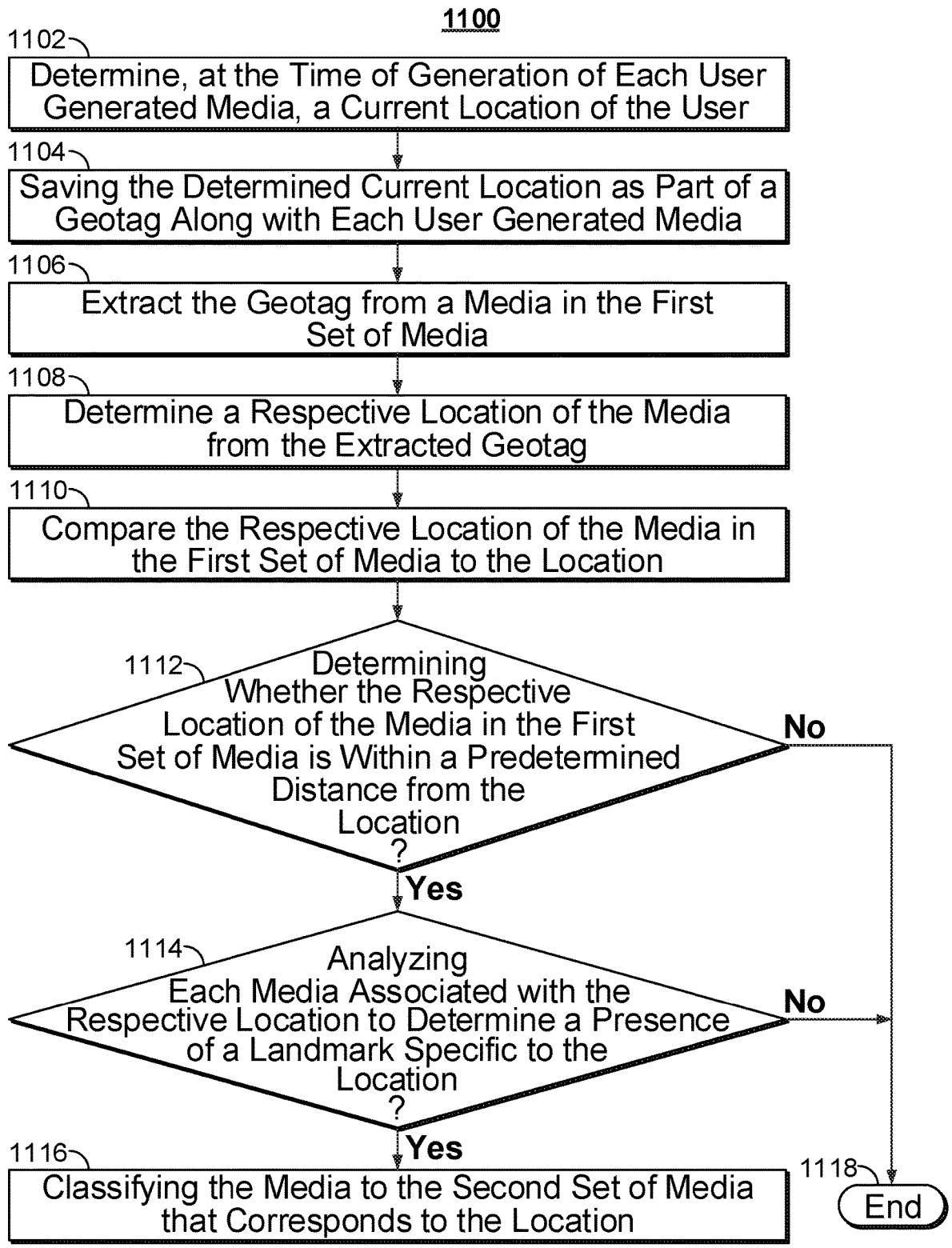
FIG. 11 depicts an illustrative flowchart of a process for determining personal media corresponding to a location referenced in the media asset, in accordance with some embodiments of the disclosure.

FIG. 11 depicts an illustrative flowchart of a process for determining personal media corresponding to a location referenced in the media asset, in accordance with some embodiments of the disclosure. Process 1100 may be executed by control circuitry 504 (e.g., in a manner instructed to control circuitry 504 by the media guidance application). In addition, one or more steps of process 1100 may be incorporated into or combined with one or more steps of any other process or embodiment (e.g., as described in relation to FIGS. 7-10 and 12-14).

Process 1100 begins at 1102, when control circuitry 504 determines at the time of generation of each user generated media, a current location of the user. For example, at the time of generation of any media by the user, the device on which the media is generated may provide a location to an application that is generating the media. The application generating the media may save the location with media that has been generated as part of a geotag of the media.

At 1104, control circuitry 504 saves the determined current location as part of a geotag along with each user generated media. For example, the location in the geotag may be stored as a phrase, and as latitude and longitude coordinates for reference later.

At 1106, control circuitry 504 extracts the geotag from a media in the first set of media. In some embodiments, the extracted geotag may be in the form of latitude and longitude coordinates. In some embodiments, the extracted geotag may be an alphanumeric string representing a location.

At 1108, control circuitry 504 determines a respective location of the media from the extracted geotag. For example, the media guidance application may process the geographical coordinates or the alphanumeric string of the location of user generated media to determine from a geotag associated with an image that the location of the image is 'The Address' hotel in Dubai.

At 1110, control circuitry 504 compares the respective location of the media in the first set of media to the location. For example, control circuitry 504 may compute a distance between the location (e.g., Burj Khalifa) and the determined location of the media (e.g., the Address Hotel).

At decision block 1112, control circuitry 504 determines whether the respective location of the media in the first set of media is within a predetermined distance from the location. For example, control circuitry 504 computes a distance between the 'The Address' hotel and 'Burj Khalifa'. The media guidance application may determine the distance to be 0.5 miles, which may be within a threshold distance of 2 miles from the determined location of 'Burj Khalifa'. In case the distance between the location from a geotag of the user generated media is determined to be within a threshold distance from the location referenced in the media asset 104, control circuitry 504 moves process 1100 to 1114 to analyzing each media associated with the respective location to determine a presence of a landmark specific to the location. In case the distance between the location from a geotag of the user generated media is determined to be greater than a threshold distance from the location referenced in the media asset 104, control circuitry 504 ends process 1100 at 1118.

At 1114, control circuitry 504 analyzing each media associated with the respective location to determine a presence of a landmark specific to the location. The media guidance application determines a presence of a landmark associated with the location in the media that is within the threshold distance of the location. For example, control circuitry 504, in the media asset with the geotag of the 'The Address' hotel, may search for a presence of a portion of the building 'Burj Khalifa' that is a landmark associated with the location of 'Burj Khalifa'. In case a landmark specific to the location is present in the media, control circuitry 504 moves process 1100 to 1118 to classify the media to the second set of media that corresponds to the location. In case media does not contain the landmark specific to the location is not present in the media, control circuitry 504 ends process 1100 at 1118.

At 1118, control circuitry 504 classifies the media to the second set of media that corresponds to the location.

Figure 12:
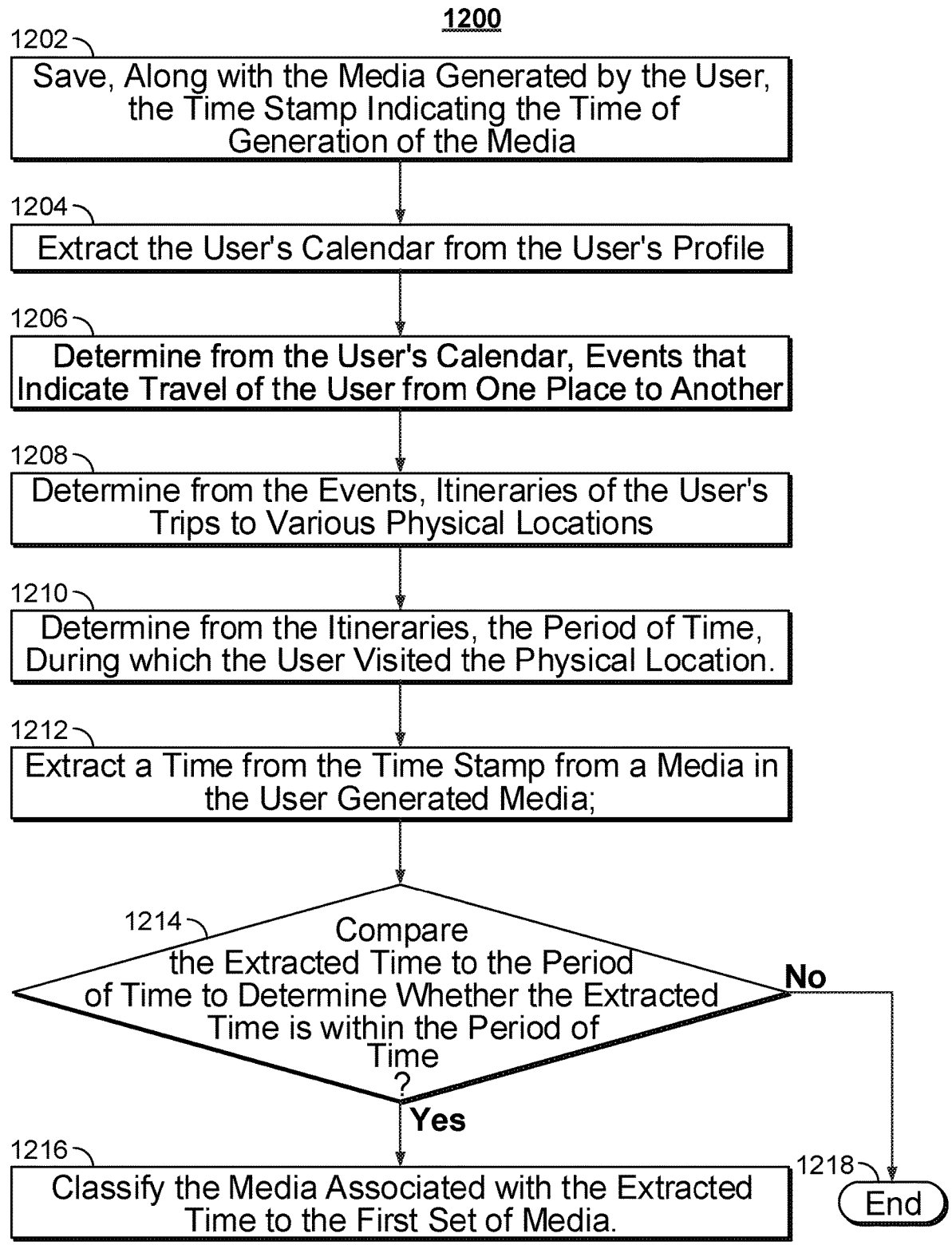
FIG. 12 depicts an illustrative flowchart of a process for determining personal media corresponding to a determined time window, in accordance with some embodiments of the disclosure.

FIG. 12 depicts an illustrative flowchart of a process for determining personal media corresponding to a determined time window, in accordance with some embodiments of the disclosure. Process 1200 may be executed by control circuitry 504 (e.g., in a manner instructed to control circuitry 504 by the media guidance application). In addition, one or more steps of process 1200 may be incorporated into or combined with one or more steps of any other process or embodiment (e.g., as described in relation to FIGS. 7-11 and 13-14).

Process 1200 begins at 1202, where control circuitry 504 saves, along with the media generated by the user, the time stamp indicating the time of generation of media. For example, at the time the user is generating media at a location, the application being used to determine the location may query the device on which the application is running for a current time, and save the current time along with the media generated.

At 1204, control circuitry 504 extracts the user's calendar from the user's profile. For example, user's calendar may be associated with the user profile in storage 508 for easy access by control circuitry 504.

At 1206, control circuitry 504 determines from the user's calendar, events that indicate travel of the user from one place to another. For example, the user may indicate itineraries on their calendar about their upcoming trips. In some embodiments, the calendar may be updated by applications used to make reservations for travel.

At 1208, control circuitry 504 determines from the itineraries, the period of time, during which the user visited the physical location. For example, the media guidance application determines from a user's calendar that the user blocked out January 19-January 28 to travel to Dubai. Control circuitry 504 may determine a travel itinerary associated with the exact dates of their travel.

At 1210, control circuitry 504 extracts a time from the time stamp of a media in the user generated media. For example, control circuitry 504 may extract a time stamp from a user generated media.

At 1212, control circuitry 504 compares the extracted time to the period of time to determine whether the extracted time is within the period of time. For example, from the exact dates and arrival times of a user's trip to the specific location determined, control circuitry 504 may determine a time period that the user spent in Dubai. Control circuitry 504 determines whether the extracted time of the user generated media is within the period of time. In case control circuitry 504 determines that the extracted time of the user generated media is within the period of time, control circuitry 504 proceeds process 1200 to 1214 to classify the media associated with the extracted time to the first set of media. In case control circuitry 504 determines that the extracted time of the user generated media is not within the period of time, control circuitry 504 ends process 1200 at 1218.

At 1214, control circuitry 504 classifies the media associated with the extracted time to the first set of media. The first set of media is processed to determine a second set of media where the second set of media corresponds to a particular location.

Figure 13:
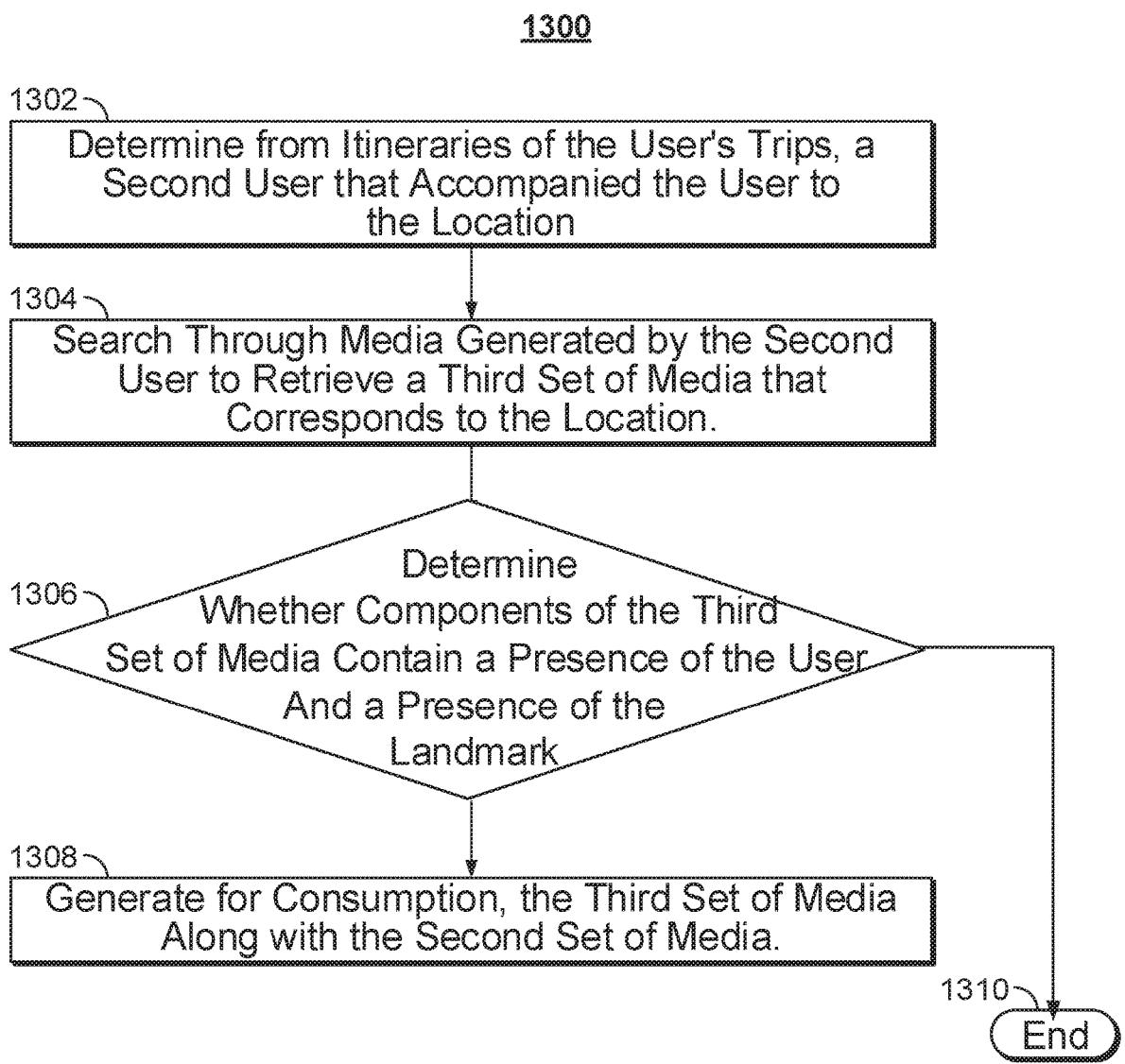
FIG. 13 depicts an illustrative embodiment of searching through media of related users for supplemental content, in accordance with an embodiment of the current disclosure.

FIG. 13 depicts an illustrative embodiment of searching through media of related users for supplemental content, in accordance with an embodiment of the current disclosure. Process 1200 may be executed by control circuitry 504 (e.g., in a manner instructed to control circuitry 504 by the media guidance application). In addition, one or more steps of process 1300 may be incorporated into or combined with one or more steps of any other process or embodiment (e.g., as described in relation to FIGS. 7-12 and 14).

Process 1300 starts at 1302, where control circuitry 504 determines from itineraries of user's trips, a second user that accompanied the user to the location. For example, control circuitry 504 may search through the itineraries to see if another user's name is listed on reservations that are made.

At 1304, control circuitry 504 determines whether components of the third set of media contain a presence of the user and a presence of the landmark. For example, media guidance application may determine if the user and the second user are related on a platform like Facebook, or have a shared album where they post media. Control circuitry 504 may use this connection to access media generated by the second user.

At decision block 1306, control circuitry 504 determines a presence of the user and a presence of a landmark specific to the location in components of the third set of media. For example, control circuitry 504 may determine from media generated by the second user whether the user, and a landmark specific to the location (e.g., Burj Khalifa) are present. In case both the user and the landmark are present, control circuitry 504 moves process 1300 to 1308 to generate the third set of media for consumption along with the second set of media. In case both the user and the landmark are not present, control circuitry 504 ends process 1300 at 1310.

At 1308, control circuitry 504 generates for consumption, the third set of media along with the second set of media. For example, control circuitry 504 adds the third set of media from the first set to the second set of media for consumption.

Figure 14:
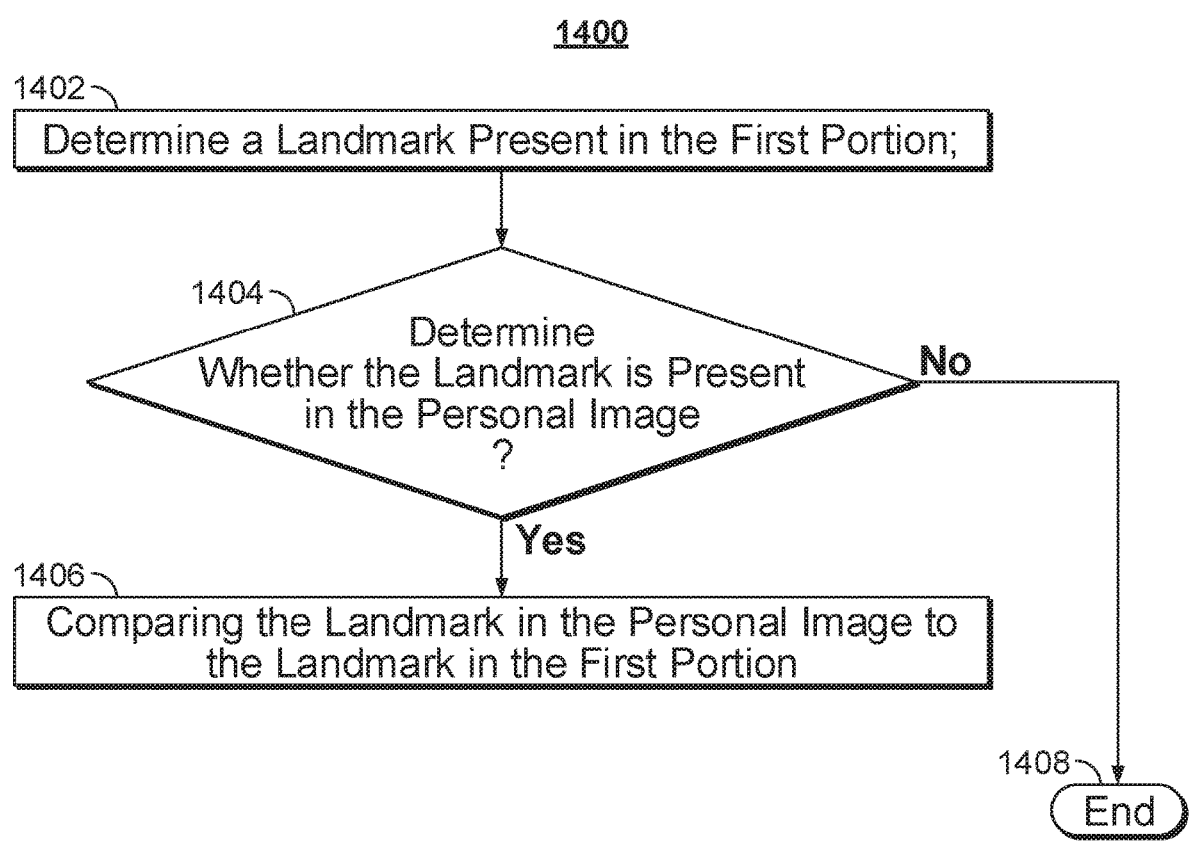
FIG. 14 depicts an illustrative flowchart of a process for generating comparative content for a media asset being consumed by a user based on content generated by the user that relates to a location referenced in the media asset, in accordance with some embodiments of the disclosure.

FIG. 14 depicts an illustrative flowchart of a process for determining personal media corresponding to a determined time window, in accordance with some embodiments of the disclosure. Process 1400 may be executed by control circuitry 504 (e.g., in a manner instructed to control circuitry 504 by the media guidance application). In addition, one or more steps of process 1200 may be incorporated into or combined with one or more steps of any other process or embodiment (e.g., as described in relation to FIGS. 7-13).

Process 1400 begins at 1402, where control circuitry 504 determines a landmark present in the first portion. For example, control circuitry 504, in a first portion extracted from media asset 202, searches for a landmark. The search for a landmark may be performed by dividing the first portion into multiple sections and analyzing the contours and color composition of each section to determine the presence of a landmark.

At 1404, control circuitry 504 determines whether the landmark is present in the personal image. For example, control circuitry looks for the determined landmark in the personal image of the user stored in storage 508. In case the personal image has a portion of the same landmark in the first portion, control circuitry 504 moves process 1400 to 1406 to compare the landmark in the personal image to the landmark in the first position. In case the personal image does not have the landmark present in the first portion, control circuitry 504 ends process 1400 at 1408.

At 1406, control circuitry 504 compares the landmark in the personal image to the landmark in the first position. In some embodiments, this comparative viewing allows the user to view a change in landmark over time. For example, the first portion may include an image of a landmark 'Burj Khalifa' in a sandstorm. The user may have visited the 'Burj Khalifa' and taken pictures. The comparative viewing allows the user to compare the current state of Burj Khalifa to the state of the Burj Khalifa at the time of the user's visit.

It is contemplated that the steps or descriptions of FIGS. 7-14 may be used with any other embodiment of this disclosure. In addition, the descriptions described in relation to the algorithm of FIGS. 7-14 may be done in alternative orders or in parallel to further the purposes of this disclosure. For example, in some embodiments, several instances of a variable may be evaluated in parallel using multiple logical processor threads or the algorithm may be enhanced by incorporating branch prediction. Furthermore, it should be noted that the process of FIGS. 7-14 may be implemented on a combination of appropriately configured software and hardware and that any of the devices or equipment discussed in relation to FIGS. 5-6 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may make reference to "convention," any such reference is merely for the purpose of providing context to the invention(s) of the instant disclosure and does not form any admission as to what constitutes the state of the art.

What is claimed is:

1. A method to generate supplemental media content for a media asset being consumed by a user based on content generated by the user that relates to a location referenced in the media asset, the method comprising:
   generating presentation of the media asset to the user;
   determining the location referenced in the media asset;
   retrieving, from a profile of the user, a history of physical locations the user has visited;
   determining whether the user has visited a vicinity of the location referenced in the media asset;
   in response to determining that the user has visited the vicinity of the location referenced in the media asset:
      determining from the history, a period of time during which the user visited the vicinity of the location referenced in the media asset;
   searching through media generated by the user to retrieve a first set of the media having a time stamp within the determined period of time;
   determining from the first set of retrieved media, a second set of media that corresponds to the location; and
   generating for consumption the second set of media.

2. The method of claim 1, wherein determining whether media in the first set of media corresponds to the location further comprises:
   determining, at the time of generation of each user generated media, a current location of the user; and
   saving the determined current location as part of a geotag along with each user generated media.

3. The method of claim 2, wherein the determining whether media in the first set of set of media corresponds to the location further comprises:
   extracting the geotag from a media in the first set of media;
   determining a respective location of the media from the extracted geotag;
   comparing the respective location of the media in the first set of media to the location; and
   based on the comparing, determining whether the respective location of the media in the first set of media is within a predetermined distance from the location.

4. The method of claim 3, wherein determining that media in the first set of media corresponds to the location further comprises:
   in response to determining that the respective location is within the predetermined distance:
      analyzing each media associated with the respective location to determine a presence of a landmark specific to the location; and
      in response to determining the presence of the landmark specific to the location:
         classifying the media to the second set of media that corresponds to the location.

5. The method of claim 1, wherein each media in the second set of media that corresponds to the location is arranged in an order based on a distance computed between the respective location of each media and the location.

6. The method of claim 1, wherein determining whether the time stamp of the media generated by the user is within the determined period of time, further comprises:
   saving, along with the media generated by the user, the time stamp indicating the time of generation of the media.

7. The method of claim 1, wherein retrieving a history of physical locations to which the user has visited further comprises:
   extracting the user's calendar from the user's profile;
   determining from the user's calendar, events that indicate travel of the user from one place to another;
   determining from the events, itineraries of the user's trips to various physical locations; and
   determining from the itineraries, the period of time, during which the user visited the physical location.

8. The method of claim 7, wherein searching through the media further comprises:
   determining from itineraries of the user's trips, a second user that accompanied the user to the location; and
   searching through media generated by the second user to retrieve a third set of media that corresponds to the location.

9. The method of claim 8, wherein generating for consumption the second set of media further comprises:
   determining a presence of the user and a presence of a landmark specific to the location in components of the third set of media; and
   based on the determining, generating for consumption, the third set of media along with the second set of media.

10. The method of claim 1, wherein determining whether the time stamp of the media generated by the user is within the determined period of time, further comprises:
   extracting a time from the time stamp from a media in the user generated media;
   comparing the extracted time to the period of time to determine whether the extracted time is within the period of time; and
   in response to determining that the extracted time is within the period of time:
      classifying the media associated with the extracted time to the first set of media.

11. A system to generate supplemental media content for a media asset being consumed by a user based on content generated by the user that relates to a location referenced in the media asset, the system comprising:
   control circuitry configured to:
      generate presentation of the media asset to the user;
      determine the location referenced in the media asset;
      retrieve, from a profile of the user, a history of physical locations the user has visited;
      determine whether the user has visited a vicinity of the location referenced in the media asset;
      in response to determining that the user has visited the vicinity of the location referenced in the media asset:
         determine from the history, a period of time during which the user visited the vicinity of the location referenced in the media asset;
         search through media generated by the user to retrieve a first set of the media having a time stamp within the determined period of time;
         determine from the first set of retrieved media, a second set of media that corresponds to the location; and
         generate for consumption the second set of media.

12. The system of claim 11, wherein control circuitry configured to determine whether media in the first set of media corresponds to the location is further configured to:
   determine, at the time of generation of each user generated media, a current location of the user; and
   save the determined current location as part of a geotag along with each user generated media.

13. The system of claim 12, wherein the control circuitry configured to determine whether media in the first set of set of media corresponds to the location is further configured to:
   extract the geotag from a media in the first set of media;
   determine a respective location of the media from the extracted geotag;
   compare the respective location of the media in the first set of media to the location; and
   based on the comparing, determine whether the respective location of the media in the first set of media is within a predetermined distance from the location.

14. The system of claim 13, wherein the control circuitry configured to determine that media in the first set of media corresponds to the location is further configured to:
   in response to determining that the respective location is within the predetermined distance:
      analyze each media associated with the respective location to determine a presence of a landmark specific to the location; and
      in response to determining the presence of the landmark specific to the location:
         classify the media to the second set of media that corresponds to the location.

15. The system of claim 11, wherein each media in the second set of media that corresponds to the location is arranged in an order based on a distance computed between the respective location of each media and the location.

16. The system of claim 11, wherein control circuitry configured to determine whether the time stamp of the media generated by the user is within the determined period of time, is further configured to:
   save, along with the media generated by the user, the time stamp indicating the time of generation of the media.

17. The system of claim 11, wherein the control circuitry configured to retrieve a history of physical locations to which the user has visited is further configured to:
   extract the user's calendar from the user's profile;
   determine from the user's calendar, events that indicate travel of the user from one place to another;
   determine from the events, itineraries of the user's trips to various physical locations; and
   determine from the itineraries, the period of time, during which the user visited the physical location.

18. The system of claim 17, wherein control circuitry configured to search through the media further, comprises:
   determine from itineraries of the user's trips, a second user that accompanied the user to the location; and
   search through media generated by the second user to retrieve a third set of media that corresponds to the location.

19. The system of claim 18, wherein control circuitry configured to generate for consumption the second set of media is further configured to:
   determine a presence of the user and a presence of a landmark specific to the location in components of the third set of media; and
   based on the determining, generate for consumption, the third set of media along with the second set of media.

20. The system of claim 11, wherein control circuitry configured to determine whether the time stamp of the media generated by the user is within the determined period of time, is further configured to:
   extract a time from the time stamp from a media in the user generated media;
   compare the extracted time to the period of time to determine whether the extracted time is within the period of time; and
   in response to determining that the extracted time is within the period of time:
      classify the media associated with the extracted time to the first set of media.

* * * * *